March 30, 1965 P. TALMEY 3,175,520
HEAT-INSULATED RAILWAY BOX CARS
Filed Sept. 1, 1961 12 Sheets-Sheet 3

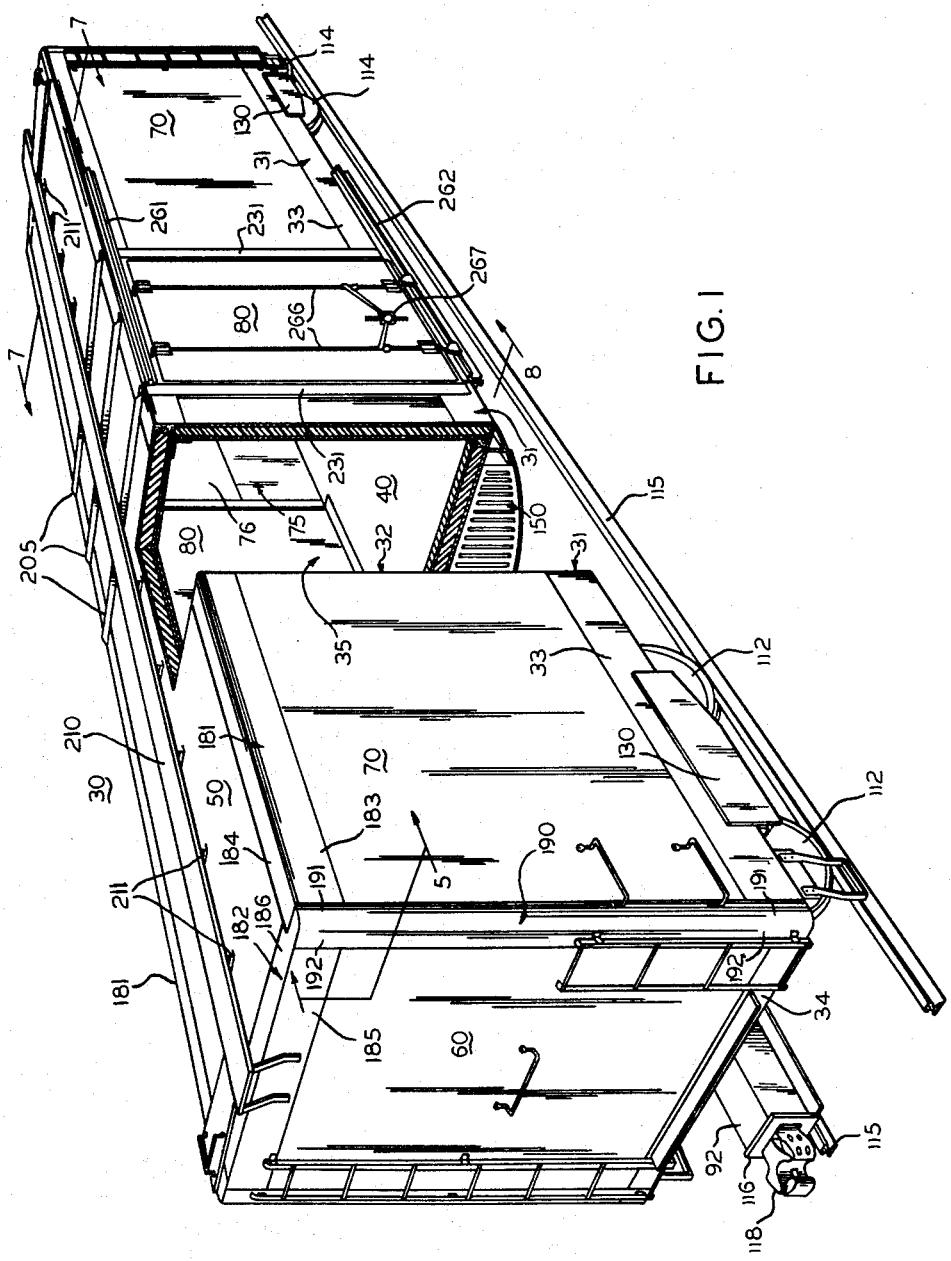

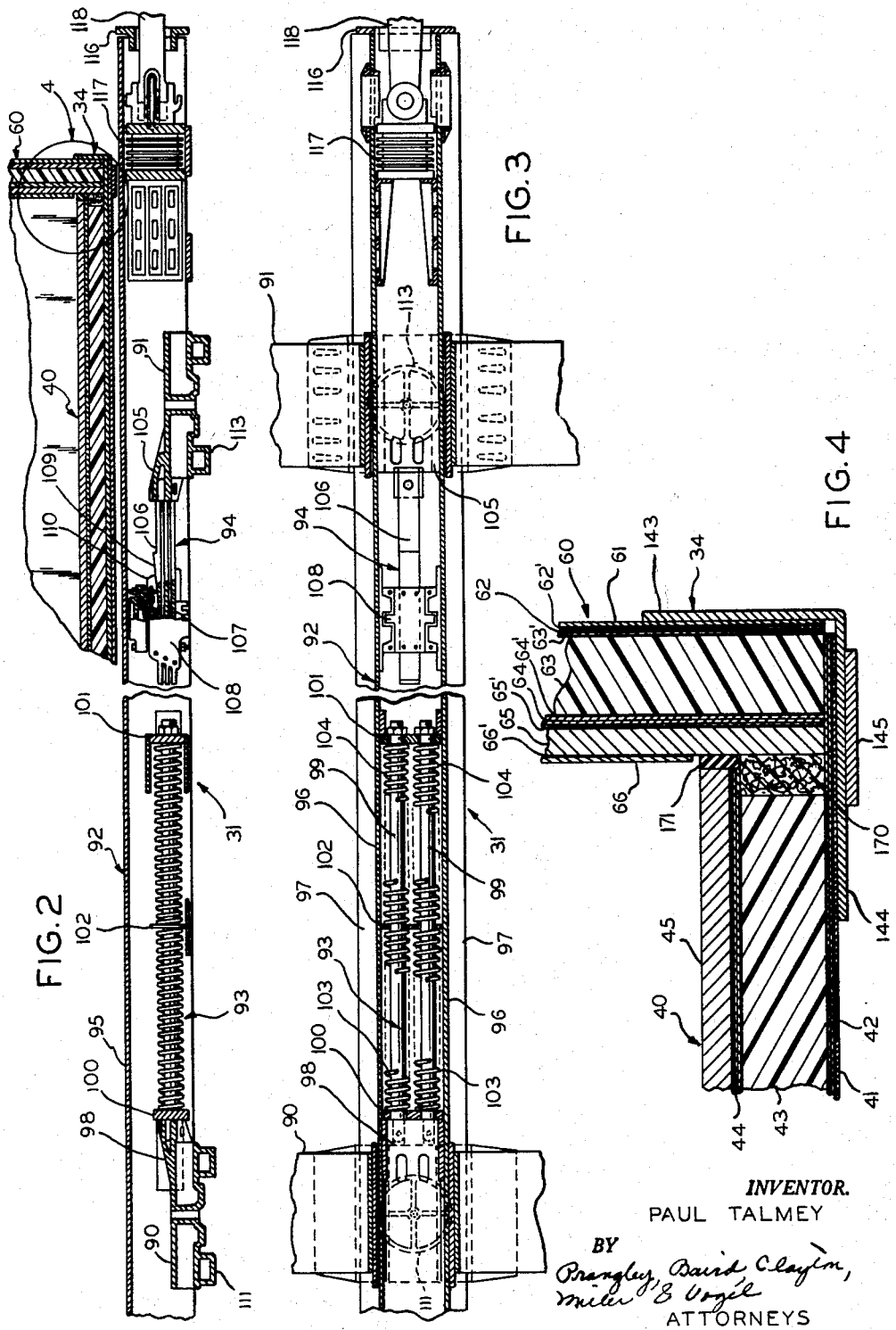

INVENTOR.
PAUL TALMEY
BY
Prangley, Baird Clayton,
Miller & Vogel
ATTORNEYS

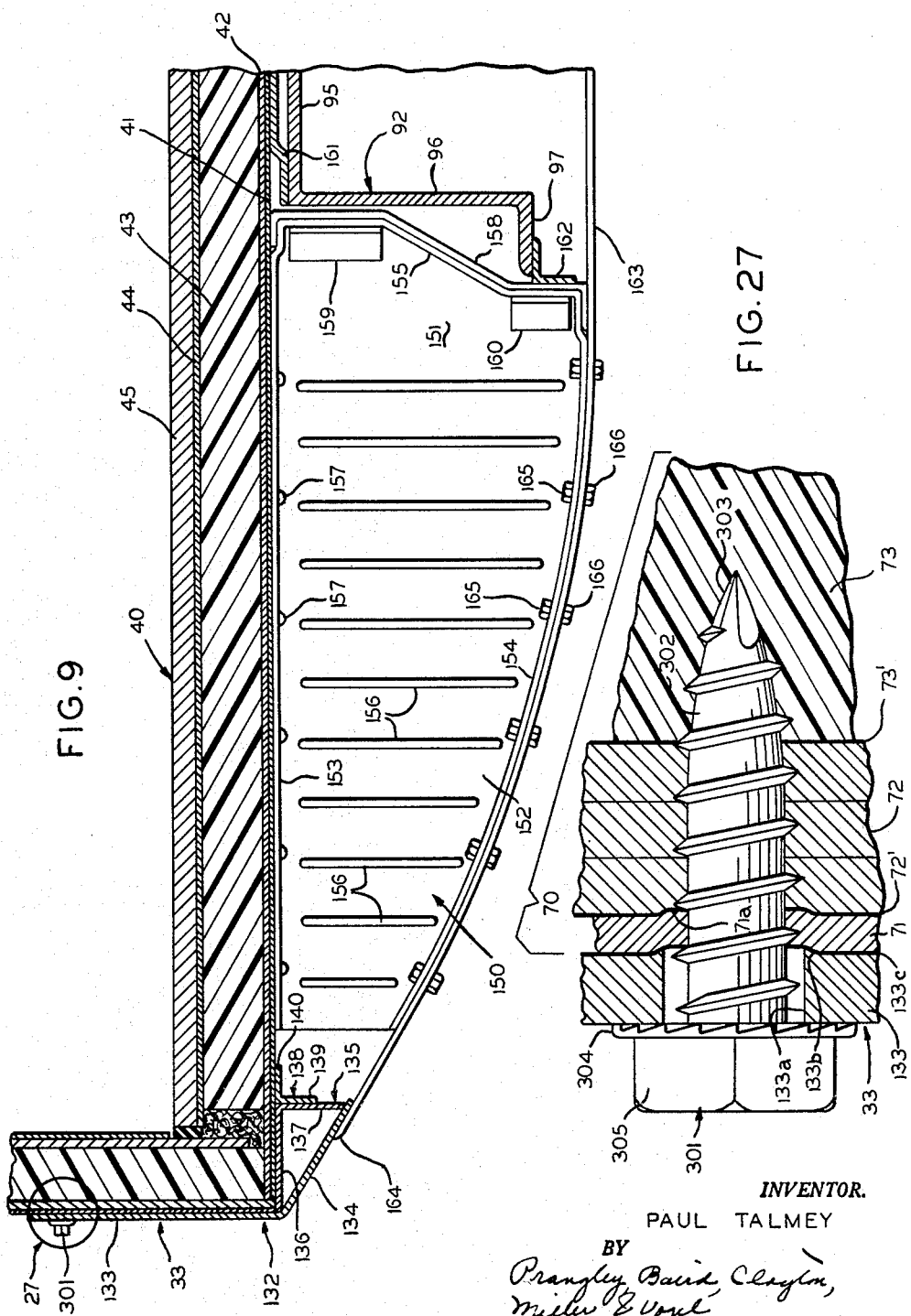

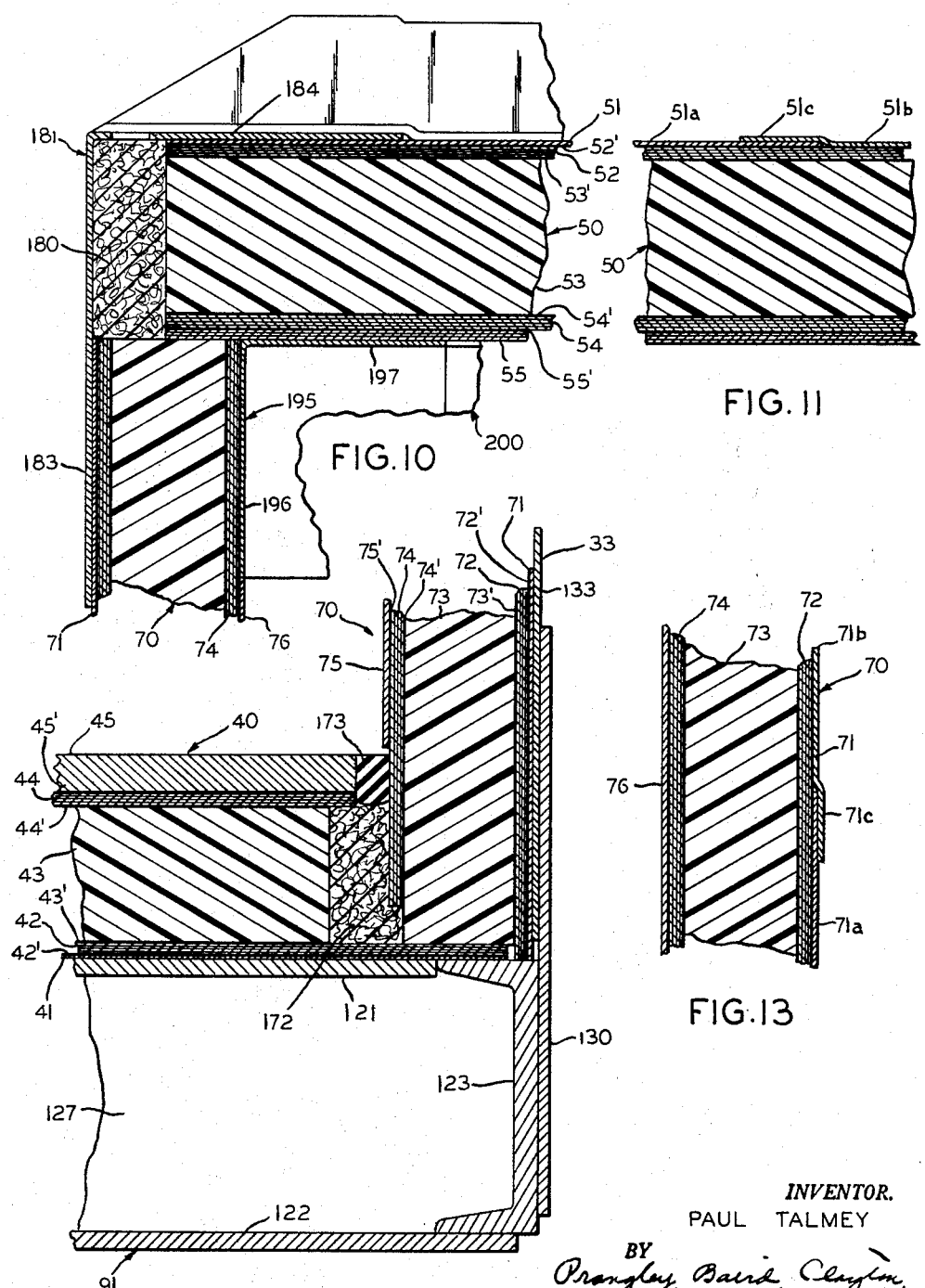

March 30, 1965 P. TALMEY 3,175,520
HEAT-INSULATED RAILWAY BOX CARS

Filed Sept. 1, 1961 12 Sheets-Sheet 7

INVENTOR.
PAUL TALMEY
BY
ATTORNEYS

March 30, 1965 P. TALMEY 3,175,520
HEAT-INSULATED RAILWAY BOX CARS
Filed Sept. 1, 1961 12 Sheets-Sheet 8
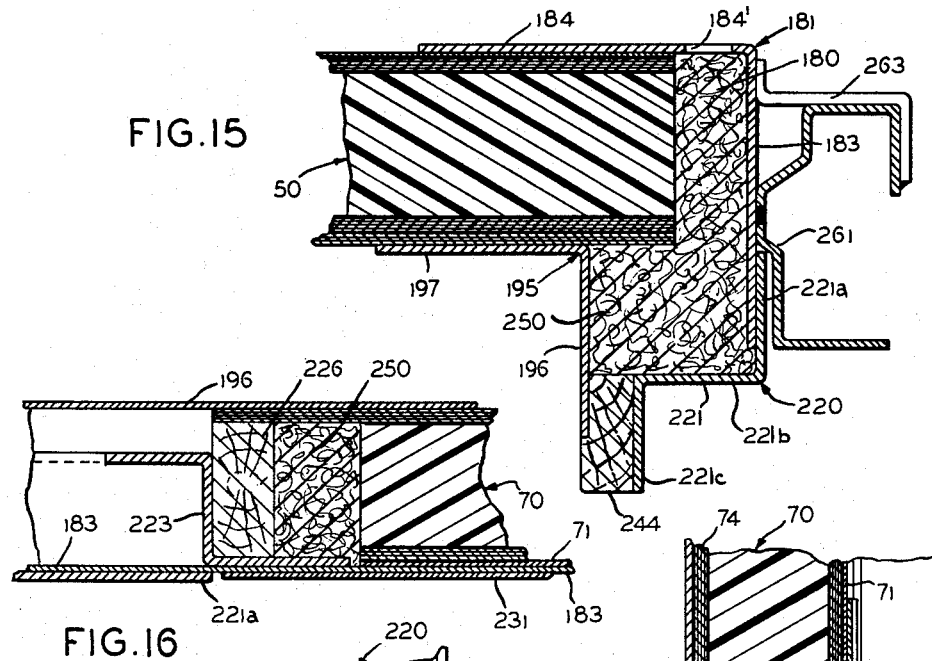
FIG.15
FIG.16
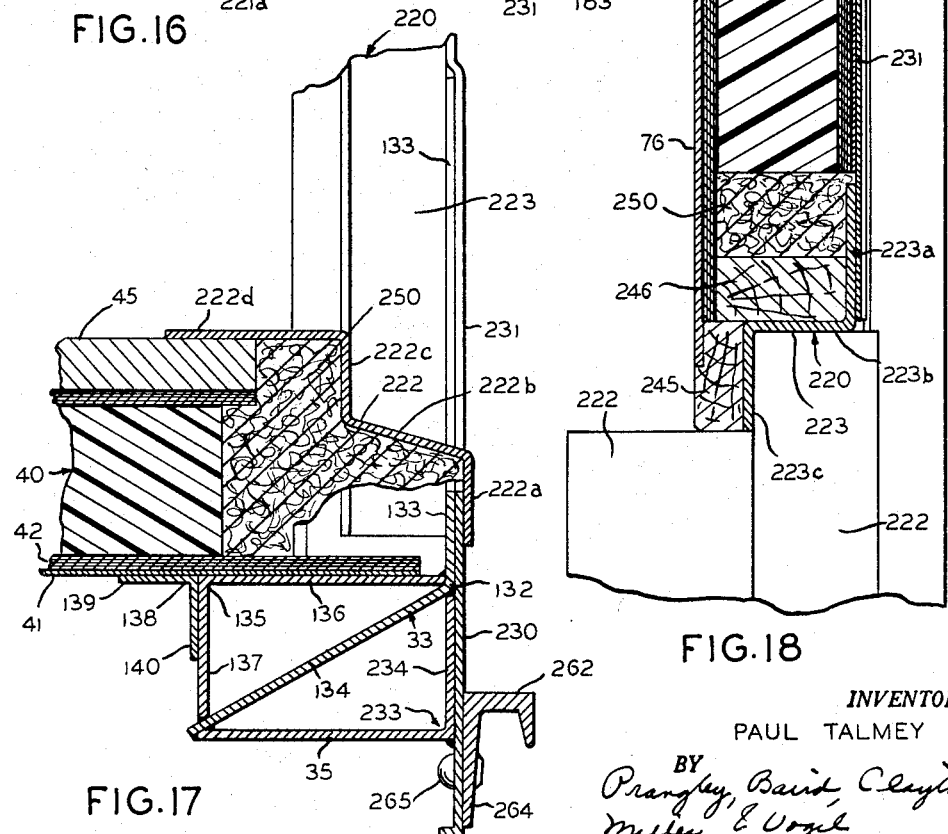
FIG.17
FIG.18
INVENTOR.
PAUL TALMEY
BY
Prangley, Baird, Clayton,
Miller & Vogel
ATTORNEYS

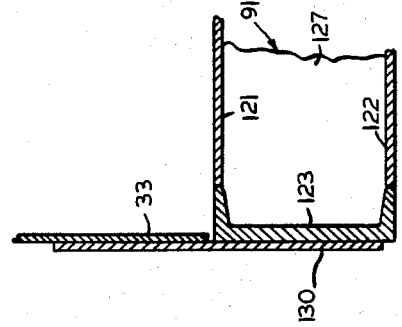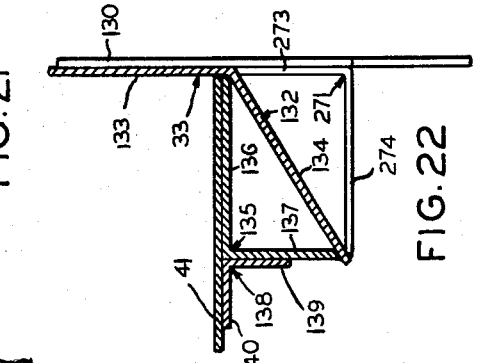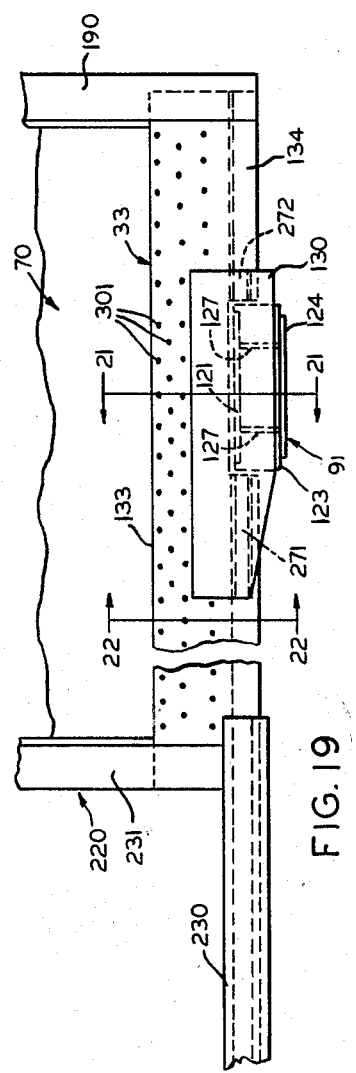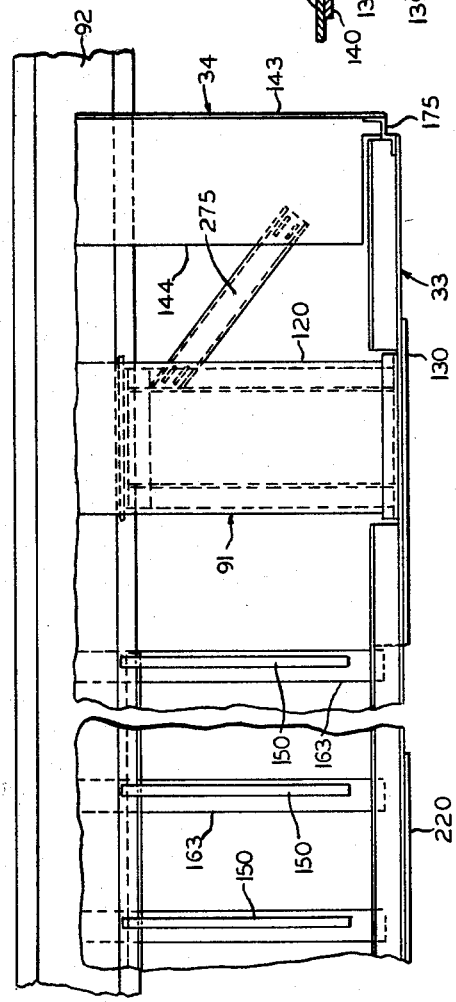
INVENTOR.
PAUL TALMEY

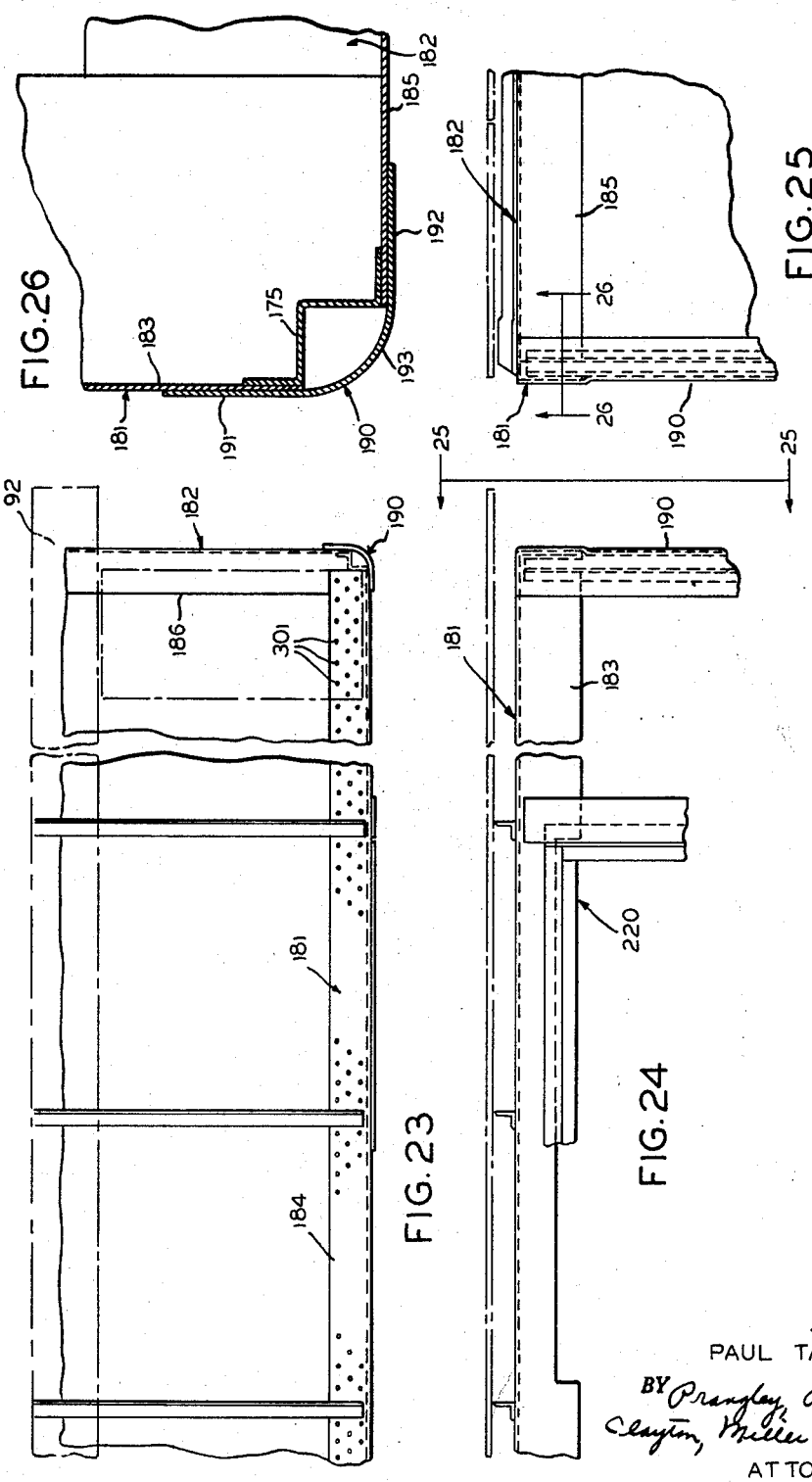

March 30, 1965 P. TALMEY 3,175,520
HEAT-INSULATED RAILWAY BOX CARS
Filed Sept. 1, 1961 12 Sheets-Sheet 11
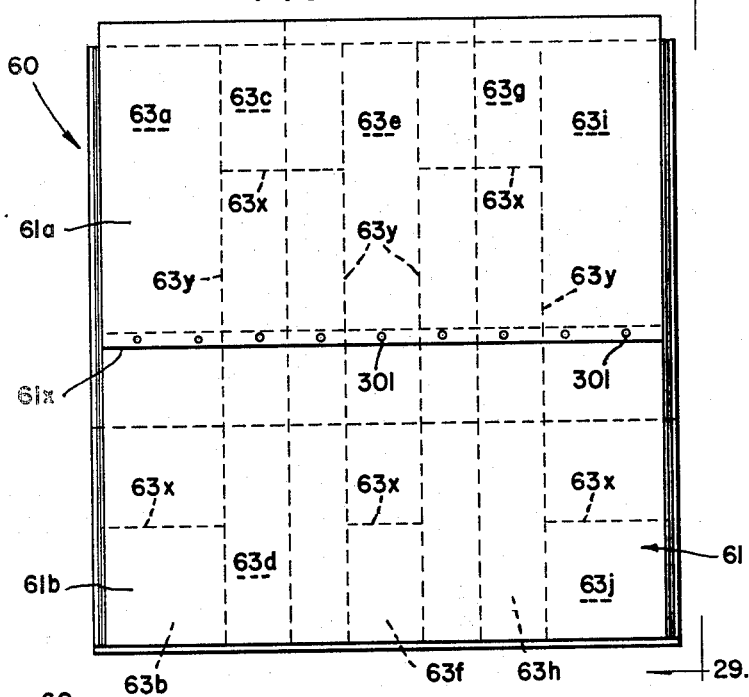
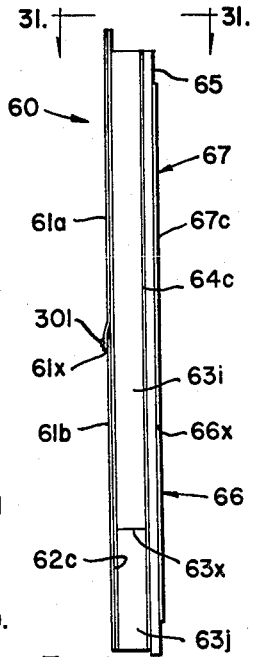
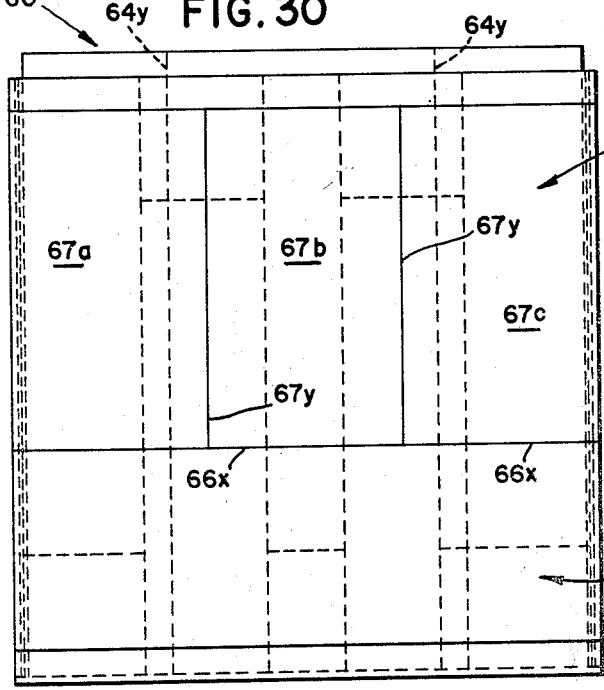
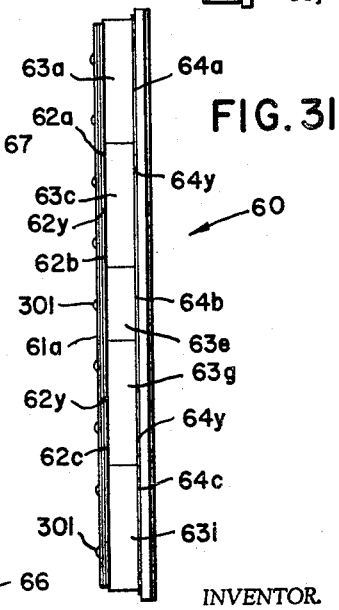
INVENTOR.
PAUL TALMEY
BY
ATTORNEYS March 30, 1965 P. TALMEY 3,175,520
HEAT-INSULATED RAILWAY BOX CARS
Filed Sept. 1, 1961 12 Sheets-Sheet 12
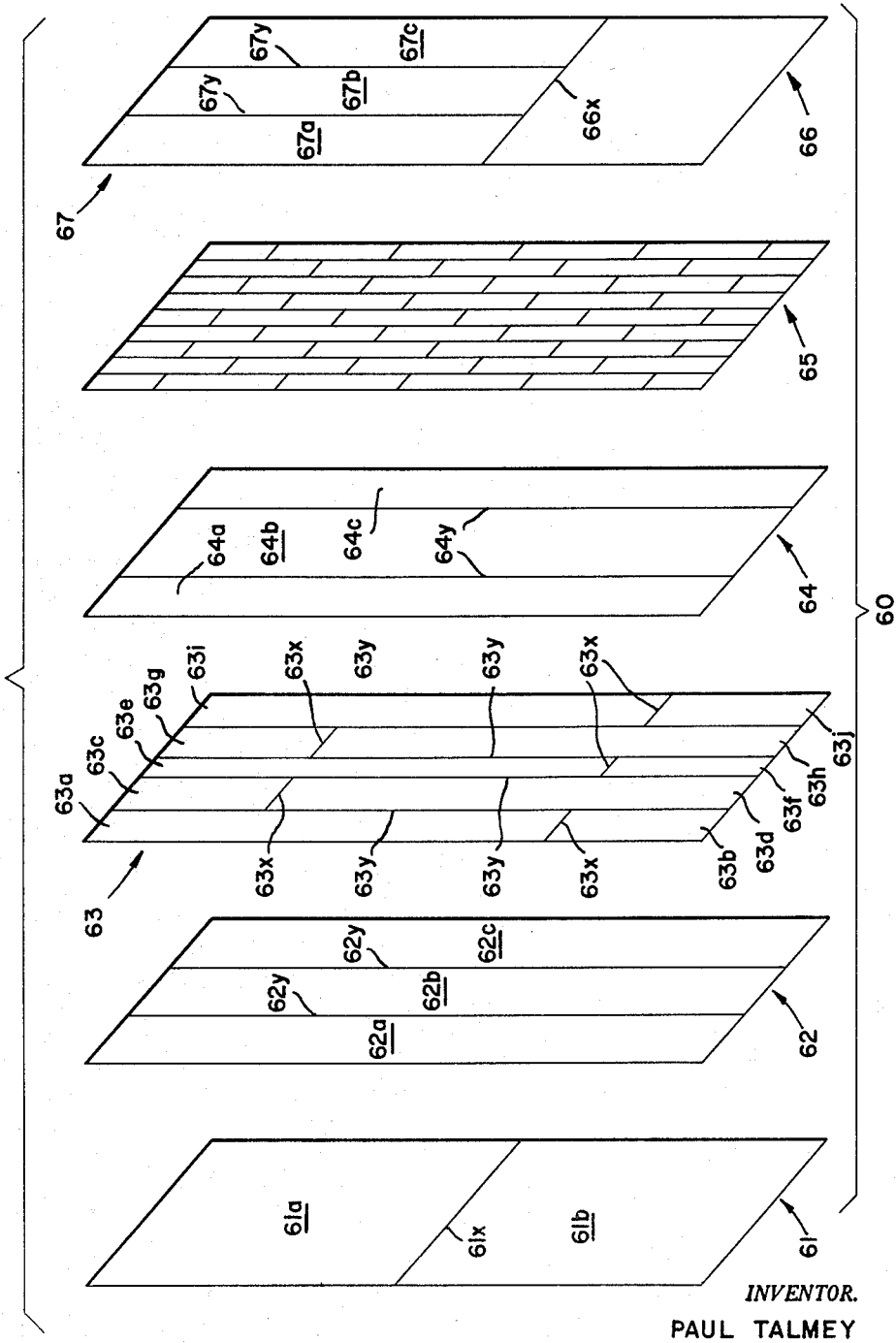
INVENTOR.
PAUL TALMEY United States Patent Office 3,175,520
Patented Mar. 30, 1965

3,175,520
HEAT-INSULATED RAILWAY BOX CARS
Paul Talmey, Barrington, Ill., assignor to General American Transportation Corporation, Chicago, Ill., a corporation of New York
Filed Sept. 1, 1961, Ser. No. 135,522
27 Claims. (Cl. 105—404)

The present invention relates to railway cars, and more particularly to heat-insulated railway box cars.

It is a general object of the invention to provide a railway box car of strong lightweight panel construction that comprises an underframe and a heat-insulated body of unitary structure, and that is simple and economical to manufacture.

Another object of the invention is to provide a railway car of the character noted, that is also of the cushioned underframe or floating center sill type.

Another object of the invention is to provide a heat-insulated railway box car comprising a body including a floor panel, a roof panel, a pair of side wall panels and a pair of end wall panels, wherein each of the six panels named is of the same fundamental rigid sandwich construction.

Another object of the invention is to provide a heat-insulated railway box car of the character noted, wherein each of the four different panels named is characterized by particular structure rendering the same especially suitable for use in the individual location thereof.

Another object of the invention is to provide a railway car construction comprising an elongated substantially rectangular frame, a pair of laterally extending and longitudinally spaced-apart body bolsters arranged in the frame adjacent to the opposite ends thereof and disposed in supporting relation therewith and rigidly secured thereto, an elongated substantially rectangular rigid floor panel arranged on top of the frame and securely fastened thereto, and a row of laterally extending and longitudinally spaced-apart cross bearers arranged between the body bolsters and rigidly secured to the frame and disposed below the bottom of the floor panel and securely fastened thereto, wherein the central portions of the body bolsters and the central portions of the cross bearers have longitudinally aligned openings therein that are adapted to receive a floating center sill, whereby the frame and the body bolsters and the floor panel and the cross bearers constitute a rigid structure independent of the center sill.

Another object of the invention is to provide a railway car construction comprising a longitudinally extending frame, a cross bearer of improved construction and arrangement disposed in the frame and comprising a pair of laterally extending upstanding rigid plates arranged in laterally spaced-apart relation and alignment with each other, and a laterally extending tie band, the central portion of the tie band spanning the lateral gap between the inner ends of the pair of plates and the opposite end portions of the tie band being respectively securely fastened to the bottoms of the pair of plates and the extreme outer ends of the tie band being rigidly secured to the adjacent side portions of the frame.

A further object of the invention is to provide a railway car construction comprising a longitudinally extending frame, a cross bearer of improved construction and arrangement disposed in the frame and comprising a pair of laterally extending upstanding rigid plates arranged in laterally spaced-apart relation and alignment with each other and defining a centrally disposed opening therein, and a laterally extending tie band, the central portion of the tie band spanning the lateral gap between the inner ends of the plates and the opposite end portions of the tie band being securely fastened to the bottoms of the pair of plates and the extreme outer ends of the tie band being rigidly secured to the adjacent sides of the frame, wherein the tie band has the general lateral configuration of a catenary between the extreme outer ends thereof and the bottoms of the plates engaging the tie band have complementary configurations approximating corresponding sections of the catenary configuration, so that the tie band is substantially uniformly loaded laterally by the plates disposed thereabove.

A further object of the invention is to provide a railway car construction comprising an elongated substantially rectangular frame, a pair of laterally extending and longitudinally spaced-apart body bolsters arranged in the frame adjacent to the opposite ends thereof and disposed in supporting relation therewith and rigidly secured thereto, an elongated substantially rectangular rigid floor panel arranged on top of the frame and securely fastened thereto, a row of laterally extending and longitudinally spaced-apart cross bearers arranged between the body bolsters and rigidly secured to the frame and disposed below the bottom of the floor panel and securely fastened thereto, the central portions of the body bolsters and the central portions of the cross bearers having longitudinally aligned openings therein, an elongated longitudinally extending center sill disposed below the central portion of the frame and mounted within the longitudinal aligned openings mentioned for longitudinal sliding movements with respect to the body bolsters and the cross bearers, and mechanism for cushioning and for snubbing longitudinal sliding movements of the center sill relative to the body bolsters, whereby the frame and the body bolsters and the floor panel and the cross bearers constitute a rigid structure independent of the center sill.

A further object of the invention is to provide a heat-insulated railway car body comprising an elongated substantially rectangular rigid floor panel an elongated substantially rectangular rigid roof panel, two laterally extending and longitudinally spaced-apart upstanding substantially rectangular rigid end wall panels, and two longitudinally extending and laterally spaced-apart upstanding substantially rectangular rigid side wall panels, wherein the bottom of each of the end wall panels is rigidly secured to the adjacent end of the floor panel and the top of each of the end wall panels is rigidly secured to the adjacent end of the roof panel and the bottom of each of the side wall panels is rigidly secured to the adjacent side of the floor panel and the top of each of the side wall panels is rigidly secured to the adjacent side of the roof panel, and the opposite ends of each of the end wall panels are respectively rigidly secured to the adjacent ends of the side wall panels; wherein the floor panel and the roof panel and the two end wall panels and the two side wall panels each is of composite sandwich construction including a first plywood sheet, a slab of synthetic organic resin of cellular structure intimately adhered to the outer surface of the first sheet, a second plywood sheet intimately adhered to the outer surface of the slab, and an outer metal weather sheet intimately adhered to the outer surface of the second sheet.

A further object of the invention is to provide a heat-insulated railway car body of the character noted, wherein the slab of synthetic organic resin of cellular structure incorporated in each of the panels mentioned is formed essentially of foamed polystyrene, and wherein the outer metal weather sheet incorporated in each of the panels mentioned is formed essentially of a metal selected from the class consisting of steel and aluminum.

A still further object of the invention is to provide a railway car construction of the character described, that further comprises an elongated substantially rectangular frame including a pair of laterally extending and longitudinally spaced-apart end sills, and a pair of longitudinally extending and laterally spaced-apart side sills, the adjacent ends of the end sills and the side sills being rigidly secured together to provide a substantially horizontal top upon the frame, and wherein the floor panel is supported upon the top of the frame and securely fastened in place with respect thereto.

A still further object of the invention is to provide a railway car construction of the character described, wherein the outer ends of the end sills respectively carry a pair of upstanding end flanges and the outer sides of the side sills respectively carry a pair of upstanding side flanges, and wherein the end flanges respectively overlie and are securely fastened to the adjacent lower portions of the end wall panels, and wherein the side flanges respectively overlie and are securely fastened to the adjacent lower portions of the side wall panels.

A still further object of the invention is to provide a heat-insulated railway car body of the character described and further comprising four upstanding end-side corner plates respectively disposed at the four upstanding corner junctions between the end wall panels and the side wall panels, each of the end-side corner plates including a first flange overlying and securely fastened to the end portion of the adjacent end wall panel and a second flange overlying and securely fastened to the end portion of the adjacent side wall panel.

A still further object of the invention is to provide a heat-insulated railway car body of the character described, and further comprising a pair of laterally extending end-roof corner plates respectively disposed at the two corner junctions between the upper portions of the end wall panels and the opposite ends of the roof panel, each of the end-roof corner plates including a first flange overlying and securely fastened to the upper portion of the adjacent end wall panel and a second flange overlying and securely fastened to the adjacent portion of the roof panel.

A still further object of the invention is to provide a heat-insulated railway car body of the character described, and further comprising a pair of longitudinally extending side-roof corner plates respectively disposed at the two corner junctions between the upper portions of the side wall panels and the opposite side of the roof panel, each of the side-roof corner plates including a first flange overlying the upper portion of the adjacent side wall panel and a second flange overlying the adjacent side portion of the roof panel.

A still further object of the invention is to provide a heat-insulated railway car body of the character described, wherein the central portions of the side panels are respectively provided with upstanding substantially rectangular doorways, and further comprising a pair of rigid substantially rectangular door frames respectively arranged in the doorways and respectively securely fastened in place, wherein each of the door frames includes bottom and top members and a pair of side members, the bottom member of each of the door frames being rigidly secured to the adjacent one of the side sills, the top member of each of the door frames being rigidly secured to the adjacent one of the side-roof plates, and the side members of each of the door frames being rigidly secured to the two portions of the adjacent one of the side panels respectively disposed on opposite sides thereof.

A still further object of the invention is to provide a heat-insulated railway car body of the character described wherein the various corner junctions between the six panels named are further reinforced and securely bonded together by associated masses of synthetic organic resin, and wherein the various junctions between the two door frames and the adjacent two side wall panels are further reinforced and securely bonded together by associated masses of synthetic organic resin, thereby to insure unitary rigid construction of all of the elements named of the car body.

Further features of the invention pertain to the particular arrangement of the elements of the railway car, whereby the above-outlined and additional operating features thereof are attained.

The invention, both as to its organization and method of operation, together with further objects and advantages thereof, will best be understood by reference to the following specification, taken in connection with the accompanying drawings, in which:

FIGURE 1 is a front perspective view of a heat-insulated railway box car, with a section thereof cut-out and removed for purpose of illustration, embodying the present invention;

FIG. 2 is an enlarged fragmentary longitudinal vertical sectional view, partly broken away, of the floating center sill structure incorporated in the underframe of the car, as shown in FIG. 1;

FIG. 3 is an enlarged fragmentary longitudinal horizontal sectional view, partly broken away of the floating center sill structure, as shown in FIG. 2;

FIG. 4 is a greatly enlarged detail of construction of the end of the car body, taken within the circle designated 4 in FIG. 2.

FIG. 9 is a greatly enlarged fragmentary lateral sectional view of the left-hand lower portion of the car, as shown in FIG. 8, and illustrating the construction and arrangement of the corresponding left-hand side of the cross bearer;

FIG. 10 is a greatly enlarged detail of the construction of the upper left-hand corner of the car body, taken within the circle designated 10 in FIG 7;

FIG. 11 is a greatly enlarged detail of the construction of the central portion of the roof of the car body, taken within the circle designated 11 in FIG. 7;

FIG. 12 is a greatly enlarged detail of the construction of the lower right-hand corner of the car body, taken within the circle designated 12 in FIG. 7;

FIG. 13 is a greatly enlarged detail of the construction of the central portion of the right-hand side of the car body, taken within the circle designated 13 in FIG. 7;

FIG. 15 is a greatly enlarged vertical sectional view of the top of the doorway, taken in the direction of the arrows along the line 15—15 in FIG. 14;

FIG. 16 is a greatly enlarged horizontal sectional view of the top of the doorway, taken in the direction of the arrows along the line 16—16 in FIG. 14;

FIG. 17 is a greatly enlarged vertical sectional view of the bottom of the doorway, taken in the direction of the arrows along the line 17—17 in FIG. 14;

FIG. 18 is a greatly enlarged horizontal sectional view of the side of the doorway, taken in the direction of the arrows along the line 18—18 in FIG. 14;

FIG. 19 is an enlarged fragmentary side elevational view of the lower portion of the railway car underframe, taken adjacent to one end thereof, and illustrating the general construction of the body bolster incorporated therein;

FIG. 20 is an enlarged fragmentary plan view, similar to FIG. 19, of the railway car underframe, taken adjacent to the one end thereof, and also illustrating the general construction of the body bolster incorporated therein;

FIG. 21 is a greatly enlarged vertical sectional view of the railway car underframe, taken in the direction of the arrows along the line 21—21 in FIG. 19, and further illustrating the construction of the underframe adjacent to the body bolster;

FIG. 22 is a greatly enlarged vertical sectional view of the railway car underframe, taken in the direction of the arrows along the line 22—22 in FIG. 19, and further illustrating the construction of the underframe adjacent to the body bolster;

FIG. 23 is an enlarged fragmentary plan view of the top of the car body, taken adjacent to the one end thereof directly over the plan view of FIG. 20;

FIG. 24 is an enlarged fragmentary side elevational view of the upper portion of the car body, taken adjacent to the one end thereof directly over the side elevational view of FIG. 19;

FIG. 25 is an enlarged fragmentary end elevational view of the upper portion of the car body, taken at the one end thereof in the direction of the arrows along the line 25—25 in FIG. 24;

FIG. 26 is a greatly enlarged fragmentary horizontal sectional view of the corner of the car body, taken adjacent to the one end thereof in the direction of the arrows along the line 26—26 in FIG. 25;

FIG. 27 is a greatly enlarged fragmentary sectional view of the side sill and the cooperating side panel, taken within the circle designated 27 in FIG. 9, and illustrating one of the fasteners employed in securing together the parts mentioned;

FIG. 28 is an enlarged front or outside elevational view of one of the end panels incorporated in the car body;

FIG. 29 is an enlarged side elevational view of the end panel of FIG. 28;

FIG. 30 is an enlarged rear or inside elevational view of the end panel of FIGS. 28 and 29;

FIG. 31 is an enlarged top view of the end panel of FIGS. 28, 29 and 30; and

FIG. 32 is a reduced exploded diagrammatic perspective view of the various plies of material that are incorporated in the end panel of FIGS. 28 to 31, inclusive.

Figure 5:
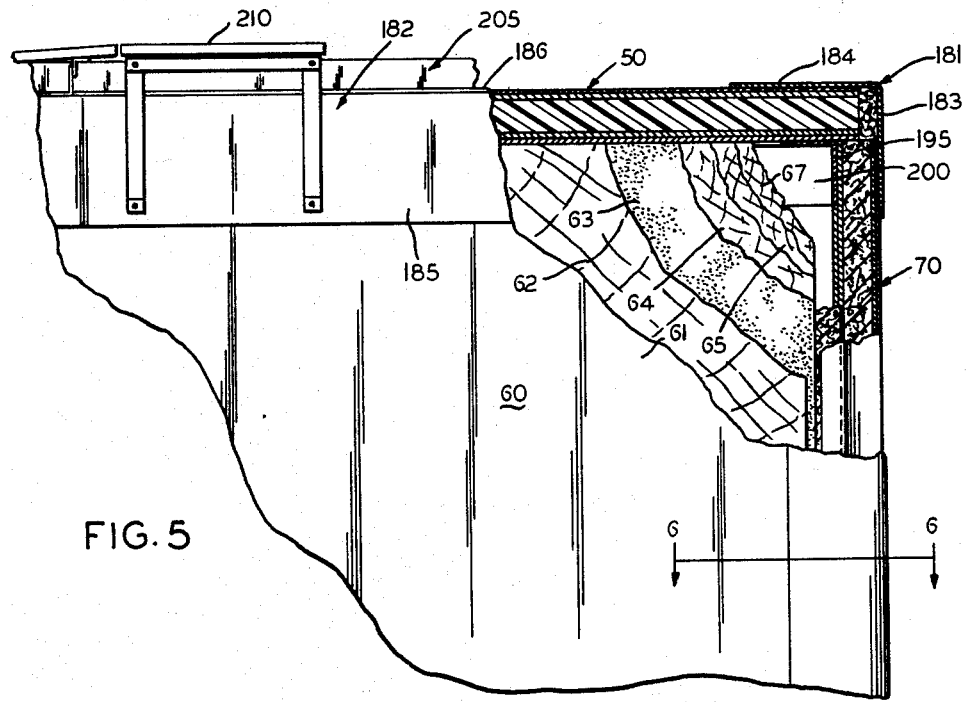
FIG. 5 is an enlarged fragmentary end elevational view of one end of the car body, this view being taken in the direction of the arrows along the offset line 5—5 in FIG. 1.

Referring now to FIG. 1, the heat-insulated railway box car 30 there illustrated, and embodying the features of the present invention, comprises a unitized underframe and body, the underframe being of the cushioned type carrying a floating center sill, and the body consisting essentially of a plurality of preformed unitary panels. More particularly, the car 30 comprises the elongated substantially rectangular underframe, indicated at 31, and the upstanding substantially box-like body, indicated at 32. Specifically, the underframe 31 includes a pair of longitudinally extending and laterally spaced-apart side sills 33 and a pair of laterally extending and longitudinally spaced-apart end sills 34, the adjacent corners between the side sills 33 and the end sills 34 being rigidly secured together, as by welding, not shown, to form the unitary underframe 31. The body 32 includes an elongated substantially rectangular floor panel 40, an elongated substantially rectangular roof panel 50, a pair of upstanding substantially rectangular end panels 60, and two pairs of upstanding substantially rectangular side panels 70. The two pairs of side panels 70 are respectively disposed on the opposite sides of the body 32, and the two individual side panels 70 disposed on each side of the body 32 are arranged in longitudinally spaced-apart relation with respect to each other, so as to provide a corresponding upstanding substantially rectangular doorway in the adjacent central portion of the side of the body 32; whereby the two substantially centrally disposed doorways mentioned are arranged in lateral alignment with respect to each other. Also, the body 32 includes a pair of heat-insulated doors 80 of the exterior plug-type respectively carried by the sides thereof and respectively cooperating with the two doorways mentioned, as explained more fully hereinafter. Accordingly, the panels 40, 50, 60 and 70 cooperate with each other to define a lading compartment 35 within the body 32 that is accessible through the two centrally disposed doorways mentioned when the respective doors 80 occupy their open positions.

Figure 7:
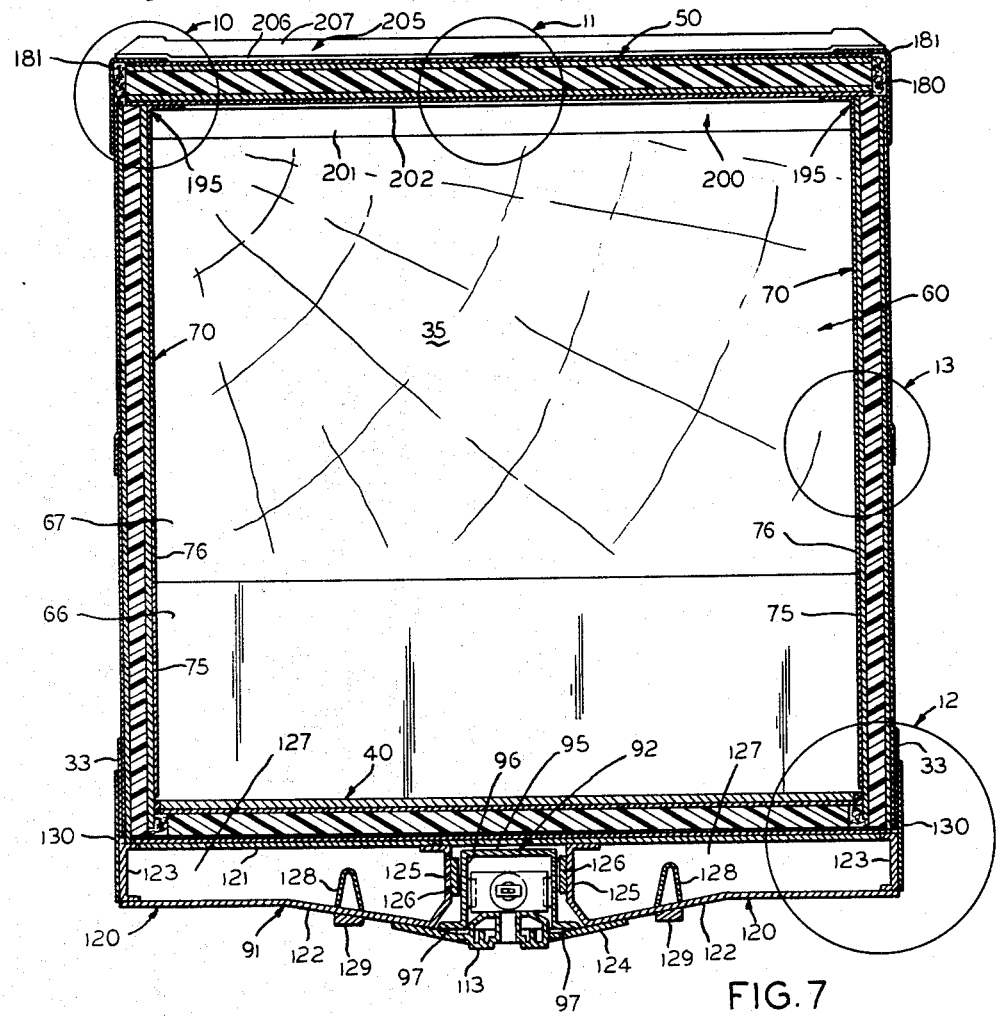
FIG. 7 is an enlarged lateral sectional view of the car, taken adjacent to one of the body bolsters and in the direction of the arrows along the line 7—7 in FIG. 1.

As best shown in FIGS. 2, 3 and 7, the underframe 31 further includes a pair of laterally extending and longitudinally spaced-apart body bolsters 90 and 91 respectively arranged adjacent to the opposite ends thereof and in supporting relation therewith; which body bolsters 90 and 91 support an elongated longitudinally extending rigid center sill 92, the center sill 92 being mounted for longitudinal floating movements upon the body bolsters 90 and 91. Further, the underframe 31 incorporates cushioning mechanism that may be of any suitable type, such, for example, as that sold by Waugh Equipment Company; which Waugh cushioning mechanism essentially comprising an individual buffing mechanism 93 cooperating between the body bolster 90 and the center sill 92 and an individual snubbing mechanism 94 cooperating between the body bolster 91 and the center sill 92. More particularly, the center sill 92 has an inverted substantially U-shaped configuration including a substantially horizontal top wall 95, a pair of upstanding side walls 96, and a pair of substantially horizontally disposed flanges 97 respectively carried by the lower portions of the side walls 96; whereby the center sill 92 is of hollow construction.

The buffing mechanism 93 is housed within the hollow center sill 92 adjacent to and inwardly of the body bolster 90 and comprises an upstanding fixture 98 rigidly carried by the central portion of the body bolster 90, as well as a pair of longitudinally extending and laterally spaced-apart rods 99 rigidly secured thereto. A follower plate 100 is arranged adjacent to the fixture 98, and a follower plate 101 is arranged adjacent to the outer ends of the rods 99, which plates 100 and 101 have openings therethrough respectively receiving the rods 99. Also a plate 102 is arranged within the center sill 92 and rigidly secured thereto, the plate 102 being disposed intermediate the two plates 100 and 101, and the rods 99 projecting through openings provided in the plate 102. Two compression springs 103 are respectively arranged in surrounding relation with the two rods 99 and in interposed position with respect to the plates 100 and 102; and likewise, two compression springs 104 are respectively arranged in surrounding relation with the two rods 99 and in interposed position with resepect to the plates 101 and 102.

In view of the foregoing, it will be understood that when the center sill 92 is moved toward the left with respect to the body bolster 90, as viewed in FIGS. 2 and 3, and consequently with respect to the underframe 31, the two compression springs 103 are compressed between the plates 102 and 100, thereby to store energy in the compression springs 103, so as to absorb the shock and gradually to accelerate the body bolster 90, and consequently the underframe 31, in movement toward the left with the center sill 92. On the other hand, when the center sill 92 is moved toward the right with respect to the body bolster 90, as viewed in FIGS. 2 and 3, and consequently with respect to the underframe 31, the two compression springs 104 are compressed between the plates 102 and 101, thereby to store energy in the compression springs 104, so as to absorb the shock and gradually to accelerate the body bolster 90, and consequently the underframe 31, in movement toward the right with the center sill 92.

The snubbing mechanism 94 is housed within the hollow center sill 92 adjacent to and inwardly of the body bolster 91 and comprises an upstanding fixture 105 rigidly carried by the central portion of the body bolster 91, as well as a longitudinally extending stack of leaf springs 106, the leaf springs 106 being stacked in the vertical direction and separated from each other by interposed cushions 107 formed of rubber, or the like. The stack of leaf springs 106 cooperates with a guide fixture 108 that is arranged within the hollow center sill 92 and rigidly secured thereto; whereby the intermediate portion of the stack of leaf springs 106 project through the guide fixture 108. The uppermost of the leaf springs 106 is provided with a bearing surface 109 that cooperates with a bearing shoe 110 that is carried by the guide fixture 108; which bearing surface 109 tapers upwardly toward either end portion thereof.

In view of the foregoing, it will be understood that when the center sill 92 is moved either toward the left or toward the right, as viewed in FIGS. 2 and 3, relative to the body bolster 91, and consequently with respect to the underframe 31, the guide fixture 108 moves therewith relative to the stack of leaf springs 106, whereby this movement of the guide fixture 108 relative to the central portion of the stack of leaf springs 106 causes the bearing shoe 110 riding upon the associated bearing surface 109 to clamp together more firmly the stack of leaf springs 106, with the result that some of the energy is dissipated in compressing the stack of leaf springs 106 and the interposed cushions 107. Accordingly, some of the energy of the movement of the center sill 92 relative to the body bolster 91 is absorbed in the leaf springs 106 and in the cushions 107; whereby the snubbing mechanism 94 snubs the relative movement between the center sill 92 and the body bolster 91. Also this relative longitudinal movement of the center sill 92 with respect to the body bolster 91 causes the snubbing mechanism 94 to exert a draft force between the center sill 92 and the body bolster 91, with the result that the body bolster 91, and consequently the underframe 31, is gradually accelerated in movement with the center sill 92.

Thus, it will be understood that the two individual mechanisms 93 and 94 of the overall Waugh cushioning mechanism accommodate ready longitudinal floating movements of the center sill 92 in either direction relative to the body bolsters 90 and 91, and consequently with respect to the underframe 31, and that these two individual mechanisms 93 and 94 transmit the draft forces in either direction between the center sill 92 and the body bolsters 90 and 91 while preserving a cushioning action therebetween so as to prevent the transmission of sudden and severe shocks between the center sill 92 and the underframe 31. Also, this composite mechanism, including the two individual mechanisms 93 and 94, damps or snubs sudden movements between the center sill 92 and the underframe 31 providing shock-absorbing and shock-snubbing actions therebetween.

Also, as shown in FIGS. 2 and 3, the central portion of the body bolster 90 carries a center bearing plate 111 disposed below the adjacent end of the center sill 92 and adapted to cooperate with the center plate of a truck bolster, not shown; which truck bolster forms a part of a conventional truck disposed therebelow and provided with track wheels 112, as indicated in FIG. 1; and in this conventional arrangement, the center bearing plate 111 of the body bolster 90 is secured to the center plate of the truck bolster of the associated truck by a cooperating center pin, not shown, so as to accommodate the usual articulation of the truck with respect to the associated body bolster 90. Similarly, as shown in FIGS. 2 and 3, the central portion of the body bolster 91 carries a center bearing plate 113 disposed below the adjacent end of the center sill 92 and adapted to cooperate with the center plate of a truck bolster, not shown; which truck bolster forms a part of a conventional truck disposed therebelow and provided with track wheels 114, as indicated in FIG. 1; and in this conventional arrangement, the center bearing plate 113 of the body bolster 91 is secured to the center plate of the truck bolster of the associated truck by a cooporating center pin, not shown, so as to accommodate the usual articulation of the truck with respect to the associated body bolster 91. Of course, the track wheels 112 and 114 respectively carried by the two trucks respectively disposed adjacent to the opposite ends of the underframe 31 cooperate with the usual railway track, indicated at 115 in FIG. 1.

The opposite ends of the center sill 92 respectively project longitudinally substantially beyond the outer ends of the car body 32 and respectively terminate in two striker plates 116, as illustrated in FIGS. 1, 2 and 3. The opposite ends of the center sill 92 are hollow and respectively carry conventional draft gears 117; which draft gears 117 may be identical and of the resilient type. The draft gears 117 respectively carry detachable car couplings 118 that respectively project through the associated striker plates 116; which car couplings 118 are entirely conventional and are employed for the usual car coupling purpose. Of course, it will be understood that the draft gears 117 transmit the draft forces between the two car couplings 118 through the center sill 92 of the car 30 and also provide a limited amount of shock-absorption and snubbing between the car couplers 118 and the center sill 92.

As previously indicated, the two body bolsters 90 and 91 are identical; and as best shown in FIG. 7, the body bolster 91 is disposed in surrounding relation with respect to the adjacent end portion of the center sill 92. More particularly, the body bolster 91 comprises, in addition to the center bearing plate 113 disposed below the center sill 92, two laterally outwardly extending arm sections 120 respectively disposed on opposite sides of the side walls 96 of the center sill 92. The two arms 120 are commonly defined by a laterally extending top plate 121 disposed above the top wall 95 of the center sill 92; and the two arms 120 are respectively defined by two laterally extending bottom plates 122. More particularly, the outer ends of the top plate 121 are respectively rigidly secured to the upper ends of two outer end members 123; and the outer ends of the bottom plates 122 are respectively secured to the lower ends of the outer end members 123. The inner ends of the bottom plates 122 are respectively secured to a centrally disposed plate 124 which carries the center bearing plate 113; and two inner end members 125 are respectively disposed laterally outwardly of the adjacent side walls 96 of the center sill 92 and respectively rigidly join the inner ends of the bottom plates 122 and to the adjacent inner portions of the top plate 121. The inner sides of the inner end members 125 respectively carry a pair of wear plates 126 respectively disposed immediately adjacent to the side walls 96 of the center sill 92; which wear plates 126 accommodate any rubbing action between the floating center sill 92 and the adjacent inner portions of the arms 120 of the body bolster 91 as the center sill 92 is moved longitudinally relative to the body bolster 91, in the manner previously explained. Also, as illustrated in FIG. 7, the lower flanges 97 respectively carried by the side walls 96 of the center sill 92 are supported upon the centrally disposed plate 124 of the body bolster 91 for the longitudinal sliding movements thereof relative to the body bolster 91, as previously explained.

Further, the body bolster 91 includes a pair of laterally spaced-apart upstanding plate structures 127 respectively incorporated in the arms 120 thereof. More particularly, each of the plate structures 127 rigidly joins together the associated bottom plate 122, the associated portion of the top plate 121, the associated outer end member 123 and the associated inner end member 125, thereby to provide the associated arm 120 of rigid hollow construction. Finally, a pair of reinforcing structures 128 are respectively arranged within the hollow arms 120; and a pair of laterally spaced-apart side bearing plates 129 are respectively carried by the bottom plates 122 of the two arms 120, the two side bearing plates 129 being disposed directly below the reinforcing structures 128. Of course, the side bearing plates 129 carried by the oppositely directed arms 120 of the body bolster 91 respectively cooperate with a pair of side roller bearings respectively carried by the oppositely directed arms of the truck bolster of the associated track, so as to limit tilting movements of the underframe 31 relative to the associated truck in the usual manner. Finally, the body bolster 91 comprises a pair of laterally spaced-apart upstanding load transfer plates 130 respectively disposed at the opposite ends of the arms 120 and respectively rigidly connecting together the outer end members 123 and the side sills 33 of the underframe 31.

Thus, it will be understood that each of the two body bolsters 90 and 91 is rigidly secured at the outer ends thereof to the associated pair of load transfer plates 130, and that the two load transfer plates 130 are respectively rigidly secured to the adjacent side sills 33, thereby to provide rigid connections between each of the body bolsters 90 and 91 and the underframe 31.

Before proceeding with further description of the underframe 31, it is advantageous to consider the construction and arrangement of the floor panel 40 that comprises a unitary portion of the underframe 31; whereby reference is made to FIGS. 4, 7, 8, 9, 12 and 17. More particularly, the floor panel 40 is of unitary composite sandwich construction including, as best shown in FIG. 12, an outer metal weather sheet 41, an adjacent outer plywood sheet 42, an adjacent slab 43 of synthetic organic resin of cellular structure, an adjacent inner plywood sheet 44, and an adjacent deck 45 of hardwood flooring. More specifically, the floor panel 40 is of unitary one-piece construction from end to end thereof and from side to side thereof; the lower surface of the deck 45 is intimately adhered to the adjacent upper surface of the plywood sheet 44 by an intervening layer of cement, indicated at 45'; the lower surface of the plywood sheet 44 is intimately adhered to the adjacent upper surface of the slab 43 by an intervening layer of cement, indicated at 44'; the lower surface of the slab 43 is intimately adhered to the adjacent upper surface of the plywood sheet 42 by an intervening layer of cement, indicated at 43'; and the lower surface of the plywood sheet 42 is intimately adhered to the adjacent upper surface of the weather sheet 41 by an intervening layer of cement, indicated at 42'.

In a constructional example of the floor panel 40, the weather sheet 41 comprises a metal selected from the class consisting of aluminum and steel (including stainless steel); and preferably, the weather sheet 41 comprises an steel sheet of 24 gauge (25.0 mils). Each of the plywood sheets 42 and 44 comprises a fir plywood having a thickness of about $5/16''$. The slab 43 comprises a foamed resin selected from the class consisting of polystyrene, polyurethane and epoxy; and preferably, the slab 43 comprises a foamed polystyrene resin having a thickness of about $3\frac{1}{2}''$. The deck 45 comprises a hardwood flooring, such, for example as oak; and preferably, the deck 45 comprises a layer of "Hamerloc" having a thickness of about $1\frac{1}{4}''$. In passing, it is mentioned that "Hamerloc" comprises individual elongated strips of hardwood intimately cemented together edgewise with staggered joints to form a unitary board. The layers of cement 45', etc., may be of any conventional suitable type, such, for example, as epoxy cement. Accordingly, it will be understood that the floor panel 40 is of strong rigid unitary structure.

The roof panel 50 is of a construction similar to that of the floor panel 40 above described, and particular reference is made to FIGS. 10 and 11. More particularly, the roof panel 50 is of unitary composite sandwich construction including an outer metal weather sheet 51, an adjacent outer plywood sheet 52, an adjacent slab 53 of synthetic organic resin of cellular structure, an adjacent inner plywood sheet 54, and an adjacent ceiling sheet 55 of wood. More specifically, the roof panel 50 is of unitary one-piece construction from end to end thereof and from side to side thereof; the upper surface of the ceiling sheet 55 is intimately adhered to the adjacent lower surface of the plywood sheet 54 by an intervening layer of cement, indicated at 55'; the upper surface of the plywood sheet 54 is intimately adhered to the adjacent lower surface of the slab 53 by an intervening layer of cement, indicated at 54'; the upper surface of the slab 53 is intimately adhered to the adjacent lower surface of the plywood sheet 52 by an intervening layer of cement, indicated at 53'; and the upper surface of the plywood sheet 52 is intimately adhered to the adjacent lower surface of the weather sheet 51 by an intervening layer of cement, indicated at 52'. In the roof panel 50, the weather sheet 51 comprises two longitudinally extending complementary sections 51a and 51b; and the adjacent inner edges of the sections 51a and 51b are secured together by a centrally disposed waterproof overlapped joint 51c therebetween, as illustrated in FIG. 11.

In a constructional example of the roof panel 50, the weather sheet 51 comprises a metal selected from the class consisting of aluminum and steel (including stainless steel); and preferably, the weather sheet 51 comprises a steel sheet of 24 gauge (25.0 mils). Each of the plywood sheets 52 and 54 comprises a fir plywood having a thickness of about $5/16''$. The slab 53 comprises a foamed resin selected from the class consisting of polystyrene, polyurethane and epoxy; and preferably, the slab 53 comprises a foamed polystyrene resin having a thickness of about $3\frac{1}{2}''$. The ceiling sheet 55 comprises a fir plywood having a thickness of about $\frac{1}{4}''$. The layers of cement 55', etc. may be of any conventional suitable type, such, for example, as epoxy cement. Accordingly, it will be understood that the roof panel 50 is of strong rigid unitary structure.

Figure 6:
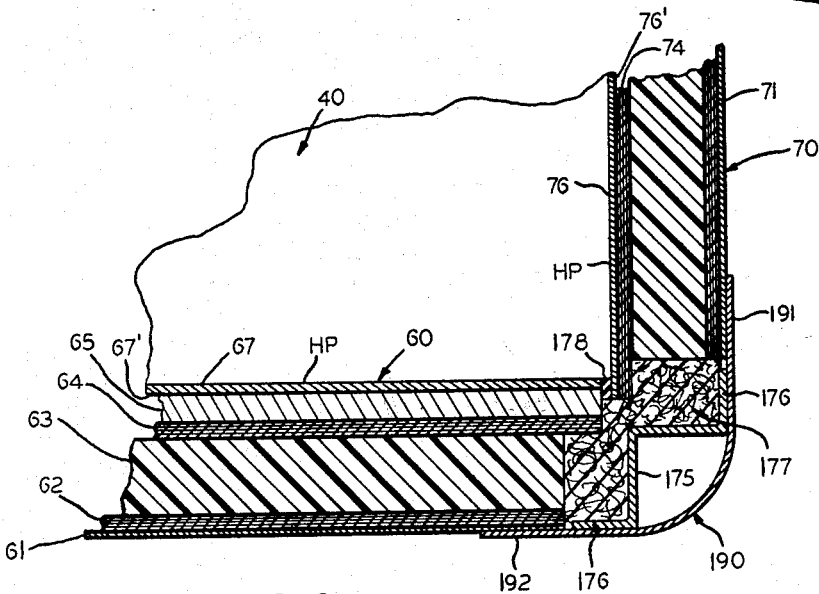
FIG. 6 is a greatly enlarged horizontal sectional view of the corner of the car body, taken in the direction of the arrows along the line 6—6 in FIG. 5.

Each of the end panels 60 is of a construction similar to that of the floor panel 40 and the ceiling panel 50, above described, and particular reference is made to FIGS. 4, 5 and 6. More particularly, each of the end panels 60 is of unitary composite sandwich construction including an outer metal weather sheet 61, an adjacent outer plywood sheet 62, an adjacent slab 63 of synthetic organic resin of cellular structure, an adjacent inner plywood sheet 64, an adjacent hardwood bulkhead 65, an adjacent lower kick sheet 66 and an adjacent upper liner sheet 67. More particularly, the end panel 60 is of unitary one-piece construction from top to bottom thereof and from side to side thereof, the outer surface of the lower kick sheet 66 is intimately adhered to the adjacent lower inner surface of the bulkhead 65 by an intervening layer of cement, indicated at 66'; the outer surface of the upper liner sheet 67 is intimately adhered to the adjacent upper inner surface of the bulkhead 65 by an intervening layer of cement, indicated at 67'; the outer surface of the bulkhead 65 is intimately adhered to the adjacent inner surface of the plywood sheet 64 by an intervening layer of cement, indicated at 64'; the outer surface of the slab 63 is intimately adhered to the adjacent inner surface of the plywood sheet 62 by an intervening layer of cement, indicated at 63'; and the outer surface of the plywood sheet 62 is intimately adhered to the adjacent inner surface of the weather sheet 61 by an intervening layer of cement, indicated at 62'.

In a constructional example of the end panel 60, the weather sheet 61 comprises a metal selected from the class consisting of aluminum and steel (including stainless steel); and preferably, the weather sheet 61 comprises a steel sheet having a thickness of about $3/32''$. Each of the plywood sheets 62 and 64 comprises a fir plywood having a thickness of about $5/16''$. The slab 63 comprises a foamed resin selected from the class consisting of polystyrene, polyurethane and epoxy; and preferably, the slab 63 comprises a foamed polystyrene resin having a thickness of about $3''$. The bulkhead 65 comprises a layer of "Hamerloc" having a thickness of about 1" and of the construction previously described. The kick sheet 66 comprises a steel sheet of 9 gauge (156 mils). The liner sheet 67 comprises a hardwood sheet of hickory-pecan having a thickness of about 3/20". The layers of cement 67', etc., may be of any conventional suitable type, such, for example, as epoxy cement. Accordingly, it will be understood that each of the end panels 60 is of strong rigid unitary structure.

Each of the side panels 70 is of a construction similar to that of the end panels 60 above described; and particular reference is made to FIGS. 6, 12 and 13. More particularly, each of the side panels 70 is of unitary compsite sandwich construction, including an outer metal weather sheet 71, an adjacent outer plywood sheet 72, an adjacent slab 73 of synthetic organic resin of cellular structure, an adjacent inner plywood sheet 74, an adjacent lower kick sheet 75, and an adjacent upper liner sheet 76. More particularly, the side panel 70 is of unitary one-piece construction from top to bottom thereof and from side to side thereof; the outer surface of the lower kick sheet 75 is intimately adhered to the adjacent lower inner surface of the plywood sheet 74 by an intervening layer of cement, indicated at 75'; the outer surface of the upper liner sheet 76 is intimately adhered to the adjacent upper inner surface of the plywood sheet 74 by an intervening layer of cement, indicated at 76'; the outer surface of the plywood sheet 74 is intimately adhered to the adjacent inner surface of the slab 73 by an intervening layer of cement, indicated at 74'; the outer surface of the slab 73 is intimately adhered to the adjacent inner surface of the plywood sheet 72 by an intervening layer of cement, indicated at 73'; and the outer surface of the plywood sheet 72 is intimately adhered to the adjacent inner surface of the weather sheet 71 by an intervening layer of cement, indicated at 72'. In the side panel 70, the weather sheet 71 comprises two longitudinally extending complementary sections 71a and 71b; and the adjacent inner edges of the sections 71a and 71b are secured together by a centrally disposed waterproof overlapped joint 71c therebetween, as illustrated in FIG. 13.

In a constructional example of the side panel 70, the weather sheet 71 comprises a metal selected from the class consisting of aluminum and steel (including stainless steel); and preferably, the weather sheet 71 comprises a steel sheet of 20 gauge (37.5 mils). Each of the plywood sheets 72 and 74 comprise a fir plywood having a thickness of about 5/16". The slab 73 comprises a foamed resin selected from the class consisting of polystyrene, polyurethane and epoxy; and preferably, the slab 73 comprises a foamed polystyrene resin having a thickness of about 3". The kick sheet 75 comprises a steel sheet of 9 gauge (156 mils). The liner sheet 76 comprises a hardwood sheet of hickory-pecan having a thickness of about 3/20". The layers of cement 75', etc., may be of any conventional suitable type, such, for example, as epoxy cement. Accordingly, it will be understood that each of the side panels 70 is of strong rigid unitary structure.

Figure 8:
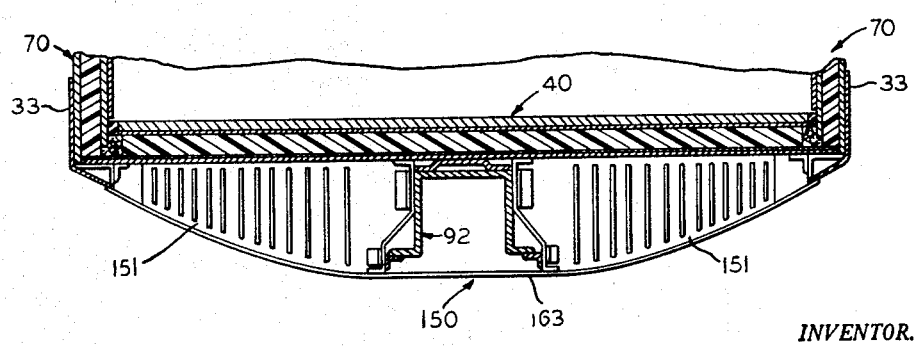
FIG. 8 is an enlarged fragmentary lateral sectional view of the car, similar to FIG. 7, taken between the body bolsters and adjacent to one of the cross bearers and in the direction of the arrows along the line 8—8 in FIG. 1.

Considering further the construction of the underframe 31, it is pointed out that each of the longitudinally extending side sills 33 is of composite hollow construction including, as best shown in FIGS. 8 and 9, an outer plate 132 provided with a substantially vertical upstanding upper section or flange 133 and an inwardly and downwardly directed lower section or flange 134, as well as a substantially angle-shaped member 135 including a substantially horizontal flange 136 and a substantially vertical flange 137. The member 135 is arranged inwardly of the outer plate 132 and is rigidly secured thereto, as by welding, not shown, thereby to provide the lower portion of the side sill 33 with a hollow substantially triangular configuration defined by the elements 134, 136 and 137. Further, each of the side sills 33 comprises a longitudinally extending angle member 138 provided with a vertical flange 139 rigidly secured to the inner surface of the vertical flange 137 of the member 135 and a horizontal flange 140 disposed substantially in the plane of the horizontal flange 136 of the member 135. Each of the laterally extending end sills 34 is of substantially L-shape, including, as best shown in FIG. 4, a substantially vertical flange 143 and a substantially horizontal flange 144.

In the arrangement, the upper surfaces of the elements 136 and 140 of the side sills 33 and the elements 144 of the end sills 34 are disposed in a substantially horizontal plane, so as to provide a substantially rectangular support for the floor panel 40; and the elements 133 of the side sills 33 and the elements 143 of the end sills 34 constitute upwardly directed flanges defining an upstanding substantially rectangular marginal rim about the horizontal platform defined by the elements 136 and 140 of the side sills 33 and the elements 144 of the end sills 33, as will be appreciated from an examination of FIGS. 4 and 9, taken together. Also, the central portion of the lower surface of the element 144 of each of the end sills 34 is reinforced by an associated plate 145 that is rigidly secured thereto, as by welding; which reinforcing plates 145 overlie the outer ends of the floating center sills 92, as best shown in FIG. 2.

Referring now to FIG. 20, it is noted that the underframe 31 further comprises a series of laterally extending and longitudinally spaced-apart cross bearers 150 arranged between the body bolsters 90 and 91; and in the present embodiment of the underframe 31, eighteen of the cross bearers 150 are provided. The cross bearers 150 are identical to each other; and each of the cross bearers 150 essentially comprises, as best shown in FIGS. 8 and 9, a pair of laterally spaced-apart and aligned upstanding plates 151 disposed on opposite sides of the floating center sill 92 and respectively laterally inwardly of the side sills 33. Each of the plates 151 comprises an upstanding wall 152 provided with a top flange 153, a bottom flange 154, and an inner end flange 155; and further the upstanding wall 152 is provided with a plurality of laterally spaced-apart upstanding beads or corrugations 156 to lend rigidity thereto. The upper surface of the top flange 153 carried by the upstanding wall 152 is disposed in the horizontal plane of the upper surfaces of the elements 136 and 140 of the side sills 33 and the upper surfaces of the elements 144 of the end sills 34; and the floor panel 40 is supported upon the top of the underframe 31, with the outer metal weather sheet 41 thereof in direct engagement with the elements 136 and 140 of the side sills 132, as shown in FIG. 9, with the outer metal weather sheet 41 thereof in direct engagement with the elements 144 of the end sills 34, as shown in FIG. 4, and with the outer metal weather sheet 41 thereof in direct engagement with the top flanges 153 of the upstanding plates 151 of the cross bearers 150, as shown in FIG. 9.

The top flange 153 of each of the upstanding plates 151 of each of the cross bearers 150 is rigidly secured to the adjacent lower portion of the floor panel 40 by a laterally disposed series of blind fasteners 157, as shown in FIG. 9; which individual blind fasteners 157 may be of any conventional type. The outer end of each of the upstanding plates 151 of each of the cross bearers 150 is spaced laterally inwardly from the adjacent one of the side sills 33; and the inner end of each of the upstanding plates 151 of each of the cross bearers 150 is reinforced by an associated plate 158 disposed between the adjacent side wall 96 of the floating center sill 92 and the inner flange 155, thereby to reinforce the inner flange 155, as shown in FIG. 9. Also, each of the inner flanges 155 is reinforced with respect to the adjacent upstanding wall 152 by associated upper and lower angle members 159 and 160, as shown in FIG. 9.

The central portion of the outer metal weather sheet 41 of the floor panel 40 is disposed above the top wall 95 of the floating center sill 92 and projects laterally thereacross; and a longitudinally extending bearing plate 161 is disposed between the central portion of the outer metal weather sheet 41 and the adjacent upper surface of the top wall 95 of the floating center sill 92; which bearing plate 161 is rigidly secured to the central portion of the floor panel 40 and bears upon the upper surface of the top wall 95 of the floating center sill 92 in sliding engagement therewith. Also, the cross bearer 150 comprises a pair of longitudinally extending and laterally spaced-apart angle members 162 respectively carried by the lower ends of the reinforcing plates 158 and respectively disposed below the lower flanges 97 carried by the respective side walls 96 of the floating center sill 92. More particularly, each of the angle members 162 is rigidly secured to the adjacent one of the reinforcing plates 158, as by welding, not shown, and constitutes a sliding support for the adjacent one of the lower flanges 97 disposed thereabove.

Further, the cross bearer 150 comprises a laterally extending tie band 163. The central portion of the tie band 163 spans the lateral gap between the inner ends of the plates 151 and is thus disposed below the floating center sill 92; the opposite end portions of the tie band 163 are disposed below the bottom flanges 154 carried by the plates 151; and the extreme outer ends of the tie band 163 are rigidly secured, as by welding, as indicated at 164, to the adjacent lower sections or flanges 134 of the respective side sills 33; whereby the tie band 163 is arranged in tension between the side sills 33, and thus support the plates 151 thereabove and disposed on opposite sides of the floating center sill 92. More particularly, the bottom flange 154 of each of the plates 151 is securely fastened to the adjacent end portion of the tie band 163 by a series of bolts 165 provided with associated nuts 166, as illustrated in FIG. 9. In the arrangement, the lateral configuration of the tie band 163 corresponds substantially to that of a parabola, and more particularly to that of a catenary; and likewise, the lower portions of the two plates 151 incorporated in the cross bearer 150 have configurations that respectively correspond to the two segments of the parabolic configuration of the tie band 163, as clearly shown in FIG. 9; which arrangement insures substantially uniform transmission of the lading load from the floor panel 40 through the elements 134, 136 and 137 of the side sills 33 and the upstanding plates 151 into the tie band 163 of the cross bearer 150, so as to maintain the tie band 163 in tension between the side sills 33, and thus to transmit the forces as tension forces through the tie band 163 into the side sills 33. Accordingly, the lading load upon the floor panel 40 is transmitted fundamentally through the cross bearers 150 and the side sills 33 to the side panels 70 and thus via the load transfer plates 130 to the body bolsters 90 and 91. From the body bolsters 90 and 91, the loads are transmitted to the associated trucks; whereby the floating center sill 92 comprises no substantial load-bearing portion of the underframe 31, but is employed fundamentally for the purpose of transmitting the draft forces between the car couplers 118 and the underframe 31 through the cushioning equipment, including the mechanisms 93 and 94, as previously described in conjunction with FIGS. 2 and 3. In the construction, the deck 45 of the floor panel 40 constitutes a structural diaphragm acting to distribute the floor loading thereupon substantially uniformly into the inner plywood sheet 44 and therethrough into the layer of resin 43 of cellular structure and thence through the outer plywood sheet 42 and the metal outer sheet 41 into the upstanding plates 151 of the cross bearers 150 and the side sills 33, all for the purpose of transmitting the lading loading from the floor panel 40 into the underframe 31.

Referring now to FIGS. 19, 20, 21 and 22, it will be observed that the underframe 31 is further reinforced adjacent to each of the load transfer plates 130 by a pair of longitudinally spaced-apart members 271 and 272 respectively disposed on opposite sides of the adjacent outer end member 123 of the body bolster 91 and covered by the associated load transfer plate 130. The members 271 and 272 are identical, each having a L-shape; and as best shown in FIG. 22, the member 271 comprises a substantially vertical flange 273 disposed immediately behind the associated load transfer plate 130 and rigidly secured thereto as by welding, not shown, and a substantially horizontal flange 274 that projects laterally inwardly from the lower portion of the vertical flange 273 into conjuncture with the flange 134 of the outer member 132 of the side sill 33 and the vertical flange 137 of the inner member 135 of the side sill 33. The junction between the elements 134, 137 and 274 of the respective members 132, 135 and 271 are rigidly secured, as by welding, not shown. Of course, the side sill 33 also includes the member 138 that is provided with the vertical and horizontal flanges 139 and 140, respectively, as previously explained and as illustrated in FIG. 22. Also, it will be understood that the top surfaces of the elements 136 and 140 of the respective members 135 and 138 are disposed in the horizontal plane of the outer metal weather sheet 41 of the associated floor panel 40 disposed thereabove.

The arrangement of the member 272 on the opposite side of the body bolster 91, as shown in FIG. 19, is the same as that of the member 271 described above; whereby the members 271 and 272 reinforce the connection between the side sill 33 and the transfer plate 130 at the adjacent end of the body bolster 91, as shown in FIG. 19.

Also, as shown in FIG. 20, the oppositely directed arms 120 of the body bolster 91 carry corner brackets 275 projecting therefrom and tying together the inner portions of the two arms 120 and the outer portions of the horizontal flange 144 of the end sill 34. This arrangement of the corner brackets 275 rigidly secures together the body bolster 91 and the associated end sill 34 in the underframe 31.

Also from FIG. 20, it will be appreciated that the floating center sill 92 projects longitudinally through the aligned centrally disposed openings provided in the cross bearers 150, as well as through the aligned centrally disposed openings provided in the body bolsters 90 and 91, as previously explained in conjunction with FIGS. 2 and 3. Moreover, as previously explained in conjunction with FIGS. 7 and 9, the floating center sill 92 is mounted for longitudinal sliding movements with respect to the underframe 31 both upon the body bolsters 90 and 91 and upon the eighteen cross bearers 150; whereby the floating center sill 92 is mutually supported by the body bolsters 90 and 91 and by the eighteen cross bearers 150.

Considering now in greater detail the construction of the car body 32, the floor panel 40 is directly secured to the underframe 31, in the manner previously explained, with the side edges of the floor panel 40 disposed laterally inwardly with respect to the upstanding flanges 133 of the side sills 33, as shown in FIGS. 7, 8, 9, and 12, and with the end edges of the floor panel 40 disposed longitudinally inwardly with respect to the upstanding flanges 143 of the end sills 34, as shown in FIG. 4. The end panels 60 are arranged at the opposite ends of the floor panel 40, as shown in FIG. 4, with the outer metal weather sheets 61 in respective engagements with the upstanding flanges 143 of the end sills 34 and with the lower ends of the end panels 60 footed upon the upper surfaces of the adjacent end portions of the outer plywood sheet 42 of the floor panel 40, whereby two laterally extending gaps are respectively provided between the lower portions of the end panels 60 and the adjacent ends of the other elements of the floor panel 40; which two laterally extending gaps mentioned are respectively filled with two laterally extending masses 170 of synthetic organic resin of cellular structure, such, for example, as foamed polyurethane. Finally, the two cracks between the opposite ends of the deck 45 of the floor panel 40 and the adjacent bulkheads 65 of the end panels 60 are respectively filled with two masses 171 of a suitable caulking compound, as shown in FIG. 4.

The side panels 70 are arranged at the opposite sides of the floor panel 40 on either side of the two previously mentioned doorways into the lading compartment 35, as shown in FIGS. 7, 8, 9 and 12, with the outer metal weather sheets 71 in respective engagements with the upstanding flanges 133 of the side sills 33 and with the lower ends of the side panels 70 footed upon the upper surfaces of the adjacent side portions of the outer plywood sheet 42 of the floor panel 40; whereby two longitudinally extending gaps are respectively provided between the lower portions of the side panels 70 and the adjacent sides of the other elements of the floor panel 40; which two longitudinally extending gaps mentioned are filled with two longitudinally extending masses 172 of synthetic organic resin of cellular structure, such, for example, as foamed polyurethane. Finally, the two cracks between the opposite sides of the deck 45 of the floor panel 40 and the adjacent inner plywood sheets 74 of the side panels 70 are respectively filled with two masses 173 of a suitable caulking compound, as shown in FIG. 12.

Further, the car body 32 comprises, as best shown in FIGS. 6 and 26, four upstanding corner posts 175 respectively disposed at the four corners thereof, the lower end of each of the corner posts 175 being rigidly secured, as by welding, not shown, to the adjacent junction between the side sill 33 and the end sill 34 of the underframe 31. More particularly, each of the corner posts 175 is substantially W-shaped and is arranged at the corner junction between the adjacent upstanding ends of the associated end panel 60 and the associated side panel 70 and in spaced relation with respect thereto. Specifically, the corner posts 175 includes two identical wings 176 that are respectively arranged substantially flush with the weather sheet 61 of the associated end panel 60 and with the weather sheet 71 of the associated side panel 70. The void between the inner surface of the corner post 175 and the adjacent ends of the elements of the end panel 60 and the side panel 70 is filled with an upstanding mass 177 of synthetic organic resin of cellular structure, such, for example, as foamed polyurethane. Finally, the crack between the kick plate 66 of the end panel 60 and the kick plate 76 of the side panel 70 and the continuing crack between the liner sheet 67 of the end panel 60 and the liner sheet 76 of the side panel 70 is filled with an upstanding mass 178 of a suitable caulking compound, as shown in FIG. 6.

In the car body 32, the roof panel 50 is directly supported upon the upper ends of the end panels 60 and the side panels 70, as best shown in FIGS. 1, 5, 7 and 10; and in the arrangement, the ends of the roof panel 50 are spaced longitudinally inwardly with respect to the outer weather sheets 61 of the end panels 60 and the sides of the roof panel 50 are spaced laterally inwardly with respect to the outer weather sheets 71 of the side panels 70, as best shown in FIG. 10. Accordingly, a substantially rectangular void is provided adjacent to the perimeter of the roof panel 50 and immediately above the tops of the end panels 60 and the side panels 70; which void is filled with a substantially rectangular mass 180 of synthetic organic resin of cellular structure, such, for example, as foamed polyurethane.

Further, the car body 32 comprises, as best shown in FIGS. 1, 5, 10, 23, 24, 25 and 26, a pair of longitudinally extending and laterally spaced-apart outer side-roof corner plates 181 respectively disposed at the corner junctions between the side panels 70 and the roof panel 50 and a pair of laterally extending and longitudinally spaced-apart outer end-roof corner plates 182 respectively disposed at the corner junctions between the end panels 60 and the roof panel 50. More particularly, each of the corner plates 181 is substantially L-shaped, including a vertical flange 183 overlapping the adjacent upper portions of the metal outer weather sheets 71 of the associated pair of side panels 70 and a horizontal flange 184 overlapping the adjacent side portion of the metal outer weather sheet 51 of the roof panel 50, as best shown in FIG. 10. Similarly, each of the corner plates 182 is substantially L-shaped, including a vertical flange 185 overlapping the adjacent upper portion of the metal outer weather sheet 61 of the associated end panel 60 and a horizontal flange 186 overlapping the adjacent end portion of the metal outer weather sheet 51 of the roof panel 50, as best shown in FIG. 5. Each end of each of the corner plates 182 is cut-out to receive and to fit the respective adjacent ends of the two corner plates 181, as best shown in FIGS. 1 and 23.

Further, the car body 32 comprises four upstanding outer side-end corner plates 190, as shown in FIGS. 1, 6, 23, 24, 25 and 26, that are arranged at the four corner junctions between the end panels 60 and the side panels 70. More particularly, each of the corner plates 190 is substantially L-shaped, including two flanges 191 and 192 with a substantially arcuate transition section 193 therebetween. In each of the corner plates 190, the lower portions of the flanges 191 and 192 respectively overlap the adjacent ends of the side sill 33 and the end sill 34 and are rigidly secured thereto, the intermediate portions of the flanges 191 and 192 respectively overlap the adjacent ends of the outer weather sheets 71 and 61 of the respective side panel 70 and the end panel 60 and are rigidly secured thereto, and the upper portions of the flanges 191 and 192 respectively overlap the adjacent ends of the corner plates 181 and 182 and are rigidly secured thereto.

Further, the car body 32 comprises a pair of longitudinally extending and laterally spaced-apart inner side-roof corner plates 195 arranged within the lading compartment 35 and respectively disposed adjacent to the junctions between the upper portions of the side panels 70 and the adjacent side portions of the roof panel 50, as best shown in FIGS. 5 and 10. More particularly, each of the corner plates 195 is substantially L-shaped, including a vertical flange 196 abutting the adjacent top edge of the liner sheet 76 of the associated side panel 70 and directly secured to the adjacent upper portion of the inner plywood sheet 74 of the associated side panel 70, and a horizontal flange 197 directly secured to the adjacent side portion of the ceiling sheet 55 of the roof panel 50. Also, the car body 32 comprises a pair of laterally extending and longitudinally spaced-apart inner end-roof corner plates 200 arranged within the lading compartment 35 and respectively disposed adjacent to the junctions between the upper portions of the end panels 60 and the adjacent end portions of the roof panel 50, as best shown in FIGS. 5, 7 and 10. More particularly, each of the corner plates 200 is substantially L-shaped, including a vertical flange 201 abutting the adjacent top edge of the liner sheet 67 of the associated end panel 60 and directly secured to the adjacent upper portion of the bulkhead 65 of the associated end panel 60 and a horizontal flange 202 directly secured to the adjacent end portion of the ceiling sheet 55 of the roof panel 50.

As best shown in FIGS. 1, 5, 7 and 23, the roof panel 50 carries adjacent to the central portion thereof three laterally extending and longitudinally spaced-apart carlines 205 that serve to reinforce the top of the car body 32 adjacent to the upstanding laterally aligned doorways respectively provided between the two pairs of side panels 70 disposed at the opposite sides thereof; and each of the carlines 205 is substantially L-shaped, including a horizontal flange 206 and an upstanding vertical flange 207. The opposite ends of each of the carlines 205 overlap the horizontal flanges 184 of the corner plates 181 and are rigidly secured thereto, while the intermediate portion of each of the carlines 205 is directly rigidly secured to the outer metal weather sheet 51 of the roof panel 50, as best shown in FIG. 7. Further, a longitudinally extending running board 210 is carried by the top central portion of the roof panel 50 for the general purpose of facilitating walking by a brakeman from end to end of the car 30 in the usual manner. The running board 210 may be formed of hardwood in a conventional manner, the central portion of the running board 210 being supported by the central portions of the carlines 205 and the end portions of the running board 210 being supported by a plurality of laterally extending and longitudinally spaced-apart brackets 211 disposed therebelow and also rigidly secured to the adjacent outer metal weather sheet 51 of the roof panel 50.

Figure 14:
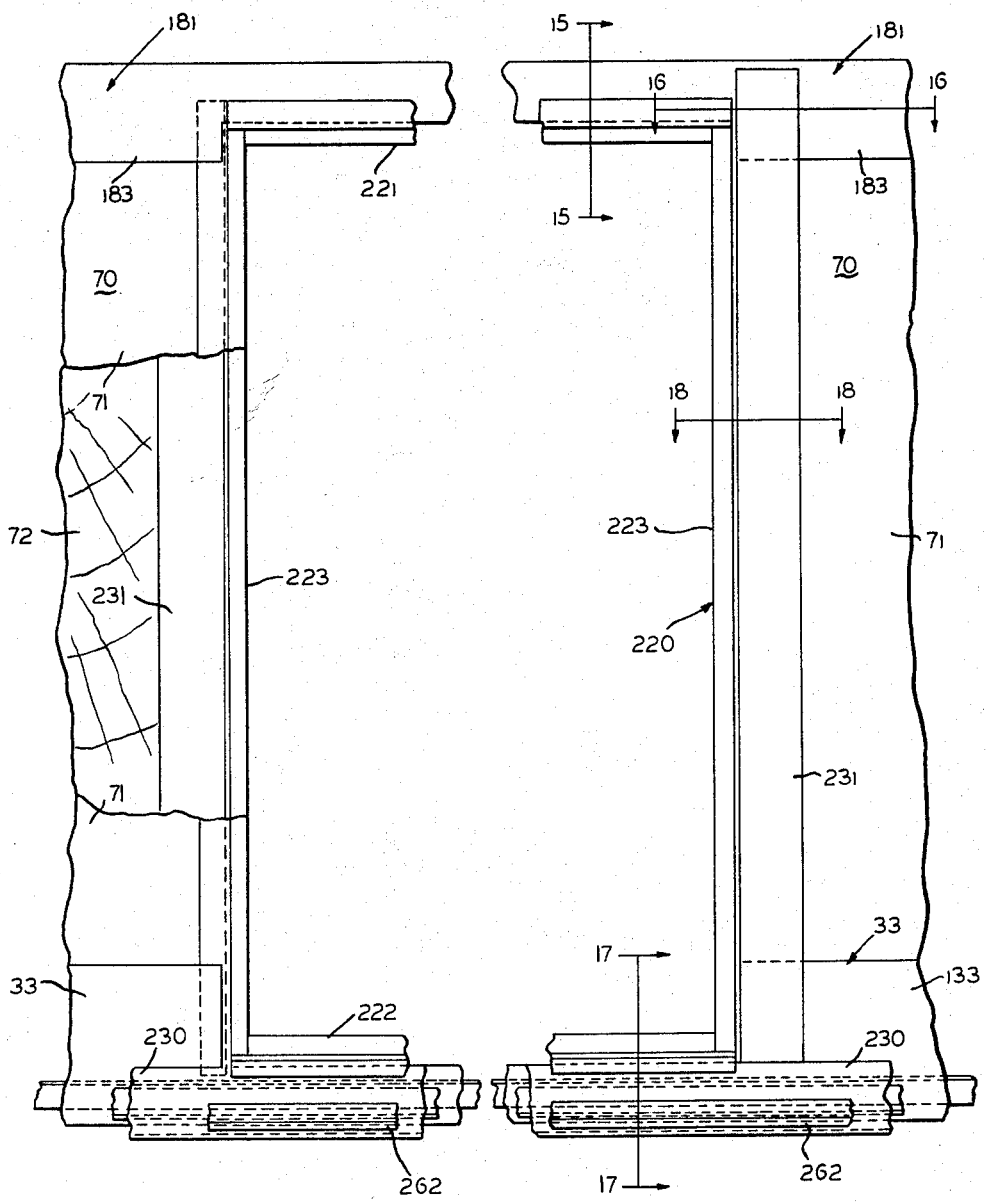
FIG. 14 is an enlarged fragmentary side elevational view, partly broken away, of the central side portion of the car body, illustrating the upstanding doorway provided therein.

Referring now to FIGS. 14, 15, 16, 17, 18, 19, 23 and 24, each of the upstanding doorways provided between each pair of the side panels 70 on each side of the car body 32 is framed by an associated upstanding substantially rectangular doorframe 220; the bottom of the doorway is reinforced by an associated bottom door plate 230; and the opposite sides of the doorway are respectively reinforced by a pair of upstanding side door plates 231. More particularly, at the doorway, the bottom door plate 230 extends longitudinally and overlies the upwardly directed flange 133 of the outer member 132 of the side sill 33 and is rigidly secured thereto, as by welding, not shown, as best illustrated in FIG. 17. Each of the side door plates 231 is rigidly secured at the lower end thereof to the upstanding flange 133 of the outer member 132 of the side sill 33 and is rigidly secured at the upper end thereof to the vertical flange 183 of the outer side-roof corner plate 181, as best shown in FIG. 14. Also, the intermediate portions of the side door plates 231 overlap the metal outer weather sheets 71 of the respectively associated side panels 70 and are rigidly secured thereto. The bottom of the doorway is further reinforced by a bottom door member 233 that is substantially L-shaped, including a vertical flange 234 and a horizontal flange 235, as shown in FIG. 17. The top of the vertical flange 234 of the bottom door member 233 abuts the junction between the flanges 133 and 134 of the outer member 132 of the side sill 33 and is rigidly secured thereto, as by welding, not shown, and the horizontal flange 235 of the bottom door member 233 extends laterally inwardly into engagement with the lower inner end of the flange 134 of the outer member 132 of the side sill 33 and is rigidly secured thereto, as by welding, not shown. Accordingly, the side sill 33 is reinforced by the bottom door member 233 and by the bottom door plate 230 at the doorway; while the side door plates 231 reinforce the adjacent inner ends of the side panels 70 by the completion of rigid connections thereby between the side sills 33 and the outer side-roof corner plates 181. Accordingly, the side wall of the car body 32 is of rigid construction, notwithstanding the provision of the upstanding doorway therethrough at the adjacent inner ends of the side panels 70 that is framed by the door frame 220; and moreover, further rigidity is lent to the composite side wall of the car body 32 by the door frame 220 that is of rigid construction, as explained more fully below.

Referring now to FIGS. 14 and 15, the composite doorframe 220 comprises an upper horizontally disposed member 221 of substantially Z-shaped cross-section, including an upper vertically extending flange 221a, a connecting horizontal web 221b and a connecting lower vertical flange 221c. Referring now to FIGS. 14 and 17, the composite doorframe 220 also comprises a lower horizontally disposed member 222 of substantially Z-shaped cross-section, including a lower vertically extending flange 222a, a connecting horizontal web 222b and a connecting upper vertically extending flange 222c; and further, the lower member 222 includes a connecting threshold plate 222d extending laterally inwardly from the top of the upper flange 222c and overlying the adjacent outer side edge of the deck 45 of the floor panel 40. Referring now to FIGS. 14 and 18, the composite doorframe 220 further comprises a pair of upstanding side members 223, each of substantially Z-shaped cross-section and including an outer longitudinally extending flange 223a, a connecting lateral web 223b and a connecting inner longitudinally extending flange 223c.

In the arrangement of the doorframe 220, the upper flange 221a of the upper member 221 overlaps the lower portion of the vertical flange 183 of the outer side-roof corner plate 181 and is rigidly secured thereto, as by welding, not shown. Similarly, the lower flange 222a of the lower member 222 overlaps the upper portion of the bottom door plate 230 and is rigidly secured thereto, as by welding, not shown. On the other hand, the outer flanges 223a of the side members 223 are respectively overlapped by the adjacent sides of the side door plates 231 and are rigidly secured thereto, as by welding, not shown.

A lintel 244, formed of a suitable hardwood, is arranged in the top of the doorway and disposed between the lower vertical flange 221c of the upper member 221 and the adjacent vertical flange 196 of the inner side-roof corner plate 195, as shown in FIG. 15, the lintel 244 being rigidly secured in place in any suitable manner. Similarly, a pair of furring strips 245 formed of a suitable hardwood are arranged on opposite sides of the doorframe 220. More particularly, the upper portion of each of the furring strips 245 is disposed between the inner flange 223c of the adjacent side member 223 and the liner sheet 76 of the adjacent side panel 70; and the lower portion of each of the furring strips 245 is disposed between the inner flange 223c of the adjacent side member 223 and the kick plate 75 of the adjacent side panel 70. Each of the furring strips 245 is rigidly secured in place in any suitable manner, not shown. Further, a pair of upstanding side posts 246 formed of a suitable hardwood are respectively disposed on opposite sides of the doorframe 220, each of the side posts 246 being disposed behind the web 223b of the adjacent side member 223 of the doorframe 220 and rigidly secured in place in any suitable manner, not shown. The outer side edge of each of the side posts 246 engages the outer flange 223a of the adjacent side member 223; and the inner side edge of each of the side posts 246 engages the outer surface of the inner plywood sheet 74 of the associated side panel 70 and is suitably secured in place.

Finally, a substantially rectangular mass 250 of synthetic organic resin of cellular structure, such, for example, as foamed polyurethane, is arranged in surrounding relation with respect to the doorframe 220. More particularly, the mass 250 includes an upper portion disposed above the upper member 221 of the doorframe 220 and between the vertical flange 183 of the outer side-roof corner plate 181 and the vertical flange 196 of the inner side-roof corner plate 195 and joining the longitudinally extending mass 180 disposed thereabove, as shown in FIG 15. Also, the mass 250 includes a lower portion disposed above the horizontal flange 136 of the inner member 135 of the side sill 33 and also above the outer plywood sheet 42 of the floor panel 40 and below the lower member 222 of the doorframe 220, as shown in FIG. 17. Also, the lower portion of the mass 250 is disposed between the inner surface of the upper flange 133 of the outer member 132 of the side sill 33 and the adjacent side of the principal elements of the floor panel 40. Further, the mass 250 includes two side portions that are respectively disposed adjacent to the side posts 246 and respectively adjacent to the principal elements of the respectively associated side panels 70, as shown in FIGS. 16 and 18. Also, each of the side portions of the mass 250 is disposed between the outer flange 223a of the adjacent side member 223 of the doorframe 220 and the inner plywood sheet 74 of the associated side panel 70.

In view of the foregoing, it will be understood that the car body 32 is of strong rigid construction, by virtue of the fact that the individual panels 40, 50, 60 and 70 are of strong rigid construction. Moreover, the side edges of the floor panel 40 are rigidly joined to the bottom edges of the side panels 70 by the associated masses 172 of synthetic resin, as shown in FIG. 12, while the end edges of the floor panel 40 are rigidly joined to the bottom edges of the end panels 60 by the associated masses 170 of synthetic resin, as shown in FIG. 4, and the perimetrical edges of the roof sheet 50 are rigidly joined to the adjacent upper edges of the side panels 70 and the end panels 60 by the associated rectangular mass 180 of synthetic resin, as shown in FIG. 10. The pair of side panels 70 at the opposite sides of the car body 32 are reinforced by the associated doorframes 220 and by the surrounding masses 250 of synthetic resin, as shown in FIGS. 15, 16, 17 and 18. Moreover, the car body 32 is reinforced by the side sills 33 and by the end sills 34, and also by the various corner plates 181, 182, 190, 195 and 200, as previously described; whereby the car body 32 comprises a structural part, with the underframe 31, to constitute a rigid unitary structure between the body bolsters 90 and 91.

As previously noted, the upstanding flange 131 of each of the side sills 33 is rigidly secured to the adjacent lower portions of the two side panels 70 disposed on opposite sides of the doorway in the adjacent side of the car body 32, and this is accomplished by utilizing a pattern of fasteners 301, as indicated in FIG. 19. More particularly, a corresponding pattern of holes is punched in the upstanding flange 133 of the side sill 33 incident to the forming thereof, and after the two side panels 70 are set in place adjacent to the associated side edge of the floor panel 40 and supported upon the side sill 33, as previously explained, the fasteners 301 are placed in the holes mentioned and then set with respect to the adjacent side panels 70.

The fasteners 301 are of the combination hole-drilling and thread-forming type; and preferably, the fasteners 301 are of the construction and arrangement of that disclosed in the copending application of Simon S. Kahn, Serial No. 29,979, filed May 18, 1960. More specifically, these fasteners are sold commercially by Parker Kalon under the trademark "Tapits," and essentially comprise an elongated shank carrying an enlarged head at one end thereof and provided with a pointed end constituting a star drill and carrying a self-tapping thread structure disposed rearwardly of the star drill. Accordingly, after one of the fasteners 301 is inserted into one of the holes punched in the flange 133 of the side sill 33, the fastener is pressed inwardly and rotated utilizing a power torque wrench, or the like; whereby the star drill carried by the point of the shank drills its own pilot hole in the outer metal weather sheet 71 and the outer plywood sheet 72 of the adjacent side panel 70, and then the self-tapping thread structure carried by the shank threads the pilot hole mentioned and draws the fastener 301 into its set position with the enlarged head thereof in firm engagement with the exterior surface of the flange 133 of the side sill 33. Of course, it is apparent that with the power torque wrench, the great plurality of required fasteners 301 may be rapidly set in the pattern of holes punched in the flange 133 of the side sill 33 in order securely to retain in place the adjacent side panels 70 and to produce a rigid structure between the side sill 33 and the adjacent side panels 70.

The upstanding flange 143 of each of the end sills 34 is rigidly secured to the adjacent lower portion of the associated end panel 60 by utilizing a corresponding pattern of fasteners, not shown, but identical to the fasteners 301, as described above in conjunction with the upstanding flange 133 of the side sill 33.

Similarly, the flanges 183 and 184 of each of the outer side-roof corner plates 181 are respectively rigidly secured to the adjacent portions of the side panels 70 and the roof panel 50; the pattern of fasteners 301 extending through the pattern of holes punched in the flange 184 of the corner plate 181 are indicated in FIG. 23.

In a like manner, the two outer end-roof corner plates 182 are rigidly secured in place; and similarly, the two inner side-roof corner plates 195 and the two inner end-roof corner plates 200 are rigidly secured in place. Moreover, the two side door plates 231 respectively disposed on opposite sides of each of the doorways into the respective sides of the car body 32 are rigidly secured in place with respect to the associated sides of the side panels 70 utilizing fasteners of the type described above.

Not only do the underframe 31 and the car body 32 act as a unitary rigid structure between the body bolsters 90 and 91, as previously noted, but this unitary structure is even more rigid than is the floating center sill 92. Specifically, the vertical deflection or sag of the unitized underframe 31 and the car body 32 between the body bolsters 90 and 91, when the car 30 is fully loaded, is substantially less than the vertical deflection or sag of the floating center sill 92 between the body bolsters 90 and 91 due to the dead weight of the floating center sill 92, when the car is empty. Specifically, the sag mentioned of the unitized underframe 31 and car body 32 adjacent to the center of the car 30 is only approximately $\frac{1}{16}''$, when the car 30 is fully loaded; whereas, the normal vertical deflection or sag of the floating center sill mentioned, if unsupported, would be approximately $\frac{5}{16}''$. However, in order to prevent sag of the floating center sill 92 the same is supported from below, not only at the bolsters 90 and 91, but also by the angle members 162 carried by the upstanding plates 151 of the longitudinally spaced-apart cross bearers 150, as previously described in conjunction with FIG. 9.

In the unitized car body 32, the metal outer weather sheets 71 of the side panels 70 not only serve the cladding function as weather shields, but they also serve as structural elements in the side panels 70 lending a considerable proportion of the strength to the composite sandwich structures. Moreover, the outer plywood sheet 72 incorporated in each of the side panels 70 substantially restrains the adjacent metal weather sheet 71 throughout the entire area thereof, so as to accommodate deflections of the weather sheet 71, within the elastic limits thereof, without crushing or buckling of localized areas of the weather sheet 71. Thus, in the composite sandwich of each of the side panels 70, the metal outer weather sheet 71 is subjected to substantial torsional stresses; whereby these substantial stresses are taken in the outer metal weather sheet 71 in each of the side panels 70 in the unitized construction of the car body 32. The same considerations apply to the metal outer weather sheet 61 incorporated in the sandwich structure of each of the end panels 60; whereby there are no crushing or buckling of localized areas of the metal outer weather sheets 61 in the end panels 60 due to the considerations above noted.

As previously explained in conjunction with FIG. 1, each of the upstanding doorways provided in the central portion of each side of the car body 32 is provided with an associated heat-insulated door 80 of the exterior plug-type; and more particularly, one of the doors 80 cooperates with each of the door frames 220, as illustrated in FIGS. 15, 16, 17 and 18. Specifically, the substantially Z-shaped configurations of the members 221, 222 and 223 of the doorframe 220 define a stepped door opening into the adjacent side of the lading compartment 35 when the plug door 80 occupies its open position; and the plug door 80 is mounted jointly upon a longitudinally extending upper trackway 261, as shown in FIGS. 1 and 5, and upon a longitudinally extending lower trackway 262, as shown in FIGS. 1 and 17. More specifically, the upper trackway 261 is rigidly secured to the outer surface of the vertical flange 183 of the outer side-roof corner plate 181 and is suitably braced by a series of brackets 263 extending between the upper trackway 261 and the vertical flange 183, as shown in FIG. 15. More specifically, the lower trackway 262 carries a lower vertical flange 264 that is suitably secured by a number of rivets, indicated at 265, to the adjacent outer surface of the bottom door plate 230. In the arrangement, the upper trackway 261 is disposed above the top of the doorway, as defined by the top of the doorframe 220, and the lower trackway 262 is disposed below the bottom of the doorway, as defined by the bottom of the doorframe 220.

The plug door 80 is of conventional heat-insulated type and includes suitable guide rollers that respectively cooperate with the upper trackway 261 and with the lower trackway 262 in the usual manner, whereby the plug door 80 may be rolled longitudinally along the exterior surface of the side of the car body 32 between open and closed positions with respect to the associated doorway defined by the cooperating doorframe 220. Also, the plug door 80 carries mechanism, generally indicated at 266 in FIG. 1, that accommodates lateral movement thereof between sealed and unsealed positions with respect to the associated doorway defined by the cooperating doorframe 220 when the plug door 80 occupies its closed position in generally covering relation with respect to the associated doorway. The mechanism 266 is entirely conventional and is selectively operative by an associated handle, indicated at 267 in FIG. 1; whereby the plug door 80 may be readily actuated between its sealed and unsealed positions with respect to the associated doorway, when it occupies its covering position with respect thereto. Also, the plug doorway 80 may be rolled longitudinally upon the trackways 261 and 262 into its entirely open position with respect to the associated doorway, so as to accommodate ready access through the doorway into the adjacent side of the lading compartment 35.

In a constructional example of the railway car 30: the length of the lading compartment 35 between the kick plates 66 of the end panels 60 is 50 ft.; the width of the lading compartment 35 between the kick plates 75 of the side panels 70 is 9 ft. 6 in.; the height of the lading compartment 35 between the top of the deck 45 of the floor panel 40 and the bottom of the ceiling sheet 55 of the roof panel 50 is 9 ft. 9 in.; the overall longitudinal distance between the metal outer weather sheets 61 of the end panel 60 is approximately 50 ft. 9 11/16 in.; the overall lateral distance between the metal outer weather sheets 71 of the side panels 70 is approximately 10 ft. 1 7/8 in.; the distance between the striker plates 116 carried by the opposite ends of the floating center sill 92 is approximately 55 ft. 8 1/4 in.; the total longitudinal travel of the floating center sill 92 relative to the underframe 31 is approximately 20 in.; and the total longitudinal travel of each of the car couplers 118 relative to the floating center sill 92 that is accommodated by the associated draft gear 117 is approximately 2 3/4 in.

In this constructional example, the railway car 30 has a lightweight (unloaded) of approximately 54,000#, a lading capacity of 115,000#, and a rail weight (loaded) of 169,000#. Of the lightweight of 54,000# of this car, the car body 32 has a weight of only 20,000#, the two trucks together have a weight of 15,000#, and the underframe 31 and all of the other gear have a weight of 19,000#. Of this 19,000#, the center sill 92 has a weight of 4,800#, the Waugh cushioning equipment (the mechanisms 93 and 94) has a weight of 2,600#, and the two car couplers 118 together have a weight of 1800#; whereby the underframe 31 proper together with the remainder of the miscellaneous gear (brake equipment, etc.) have a weight of only 9,800#.

Thus it will be appreciated that the car body 32 and the underframe 31 proper are of exceedingly lightweight in the railway car 30 of this lading capacity and of this relatively large size. Moreover, this lightweight of 54,000# in a 50 ft. heat-insulated railway box car is altogether unusual and totally beyond comparison with conventional such railway cars of comparable capacity.

In the foregoing description of the heat-insulated railway box car 30, it is noted that where the composition of a structural element is not particularly specified, the same is formed of a suitable conventional material, and ordinarily of an appropriate steel. Thus, the side sills 31, the end sills 34, the various corner plates 181, 182, 190, 195 and 200, as well as the various components of the cross bearers 150, together with the floating center sill 92, etc., are formed of appropriate steels, in a conventional manner.

Considering now the general mode of assembly of the railway car 30 and the general sequence of the fabricating steps involved therein, it is first noted that the individual panels 50, 60 and 70, as well as the plug doors 80, are prefabricated on suitable factory production lines entirely independently of the ultimate assembly of the railway car 30. Likewise, the floor panel 40 is prefabricated, with the exception of the deck 45, and independently of the assembly of the railway car 30. The floor panel 40 as thus partially prefabricated is then laid down in an inverted position upon a suitable support and the side sills 33, the body bolsters 90 and 91, the end sills 34, the floating center sill 92, the brake rigging, not shown, the Waugh cushioning equipment (the mechanisms 93 and 94), and the draft attachments (the draft gears 117) are assembled in proper relation. Then the car couplers 118 are assembled in the opposite outer ends of the floating center sill 92 and respectively connected to the associated draft gears 117. Then the body bolsters 90 and 91 are finalized and the cross bearers 150 are applied and integrated into the underframe 31, together with the load transfer plates 130.

At this time, the whole of the underframe 31 is completed; whereupon this subassembly is removed from the support mentioned and inverted; and the body bolsters 90 and 91 are placed upon the truck bolsters of the two associated trucks arranged upon a cooperating railway track. Then, the floor panel 40 is completed by the laying of the deck 45 upon the inner plywood sheet 44 utilizing the intervening layer of cement 45' to produce the final construction of the floor panel 40, as previously described. The four corner posts 175 are erected and welded in place with respect to the underframe 31. The side panels 70 and the end panels 60 are set-up with reference to the respective side sills 33 and end sills 34. Then the roof panel 50 is set-down upon the top edges of the end panels 60 and the side panels 70. The outer side-roof corner plates 181 and the outer end-roof corner plates 181 and the outer end-roof corner plates 182 are applied and then the outer side-end plates 190 are applied. At this time, all of the corresponding fasteners 301, etc., are set. The doorframes 220 are then set in the opposite sides of the body 32 to frame the doorways thereinto, and the inner side-roof corner plates 195 and the inner end-roof corner plates 200 are applied; and then the corresponding fasteners 301, etc., are set. At this time, the polyurethane masses 170, 172, 177, 250 and 180 are blown in place. In this connection, it is noted that appropriate openings or holes are provided in the horizontal flanges of the corner plates 181 and 182 in order to accommodate the reception of the foamed polyurethane; and particular reference is made to FIG. 15, wherein the hole 184' in the horizontal flange 184 of the outer side-roof corner plate 181 is illustrated for the purpose mentioned. Then the various cracks are caulked, including the application of the various masses of caulking material 171, 173, 178, etc.

The door tracks 261 and 262 are set and secured in place, and the plug doors 80 are applied and rigged. The railway car 30 is then finished by the application of the various attachments including the running board 210, the various grab irons, etc.; and ultimately, the exterior surfaces of at least the roof panel 50, the end panels 60 and the side panels 70 are painted in order to give the railway car 30 a finished appearance.

In applying the side sills 33 to the floor panel 40, a cementing procedure is employed; and specifically, a suitable epoxy resin cement is utilized. The cement is applied in liquid form to the surfaces of the elements 136 and 140 of the side sills 33 and allowed partially to set up; and while the cement is still in a tacky condition, the side sills 33 are applied to the floor panel 40. Similarly, the end sills 34 are applied to the floor panel 40. Also, the end panels 60 and the side panels 70 are cemented in place with respect to the end sills 34 and the side sills 33, in a like manner.

In connection with the applications of the outer side-roof corner plates 181 and the outer end-roof corner plates 182 to the car body 32, it has been found advantageous initially to utilize a cementing procedure prior to the setting of the fasteners 301, as previously explained. More particularly, a layer of adhesive is applied to the inner surfaces of the flanges 183 and 184 of each of the outer side-roof corner plates 181, and then the flanges of the two plates 181 are pressed in position with respect to the outside corner junctions between the upper portions of the side panels 70 and the adjacent side portions of the roof panel 50. Again, a suitable epoxy resin adhesive is employed; and in utilizing the same, it is applied in liquid form to the interior surfaces of the flanges 183 and 184 of the corner plate 181. This same procedure is recommended in applying the outer end-roof corner plates 182 and in applying the pair of doorframes 220 to the car body 32, in the manner previously described.

This procedure insures proper placement and alignment of the corner plates 181 and 182 and of the doorframes 220 with respect to the other elements of the car body 32 and also serves at least partially to maintain these elements in their finally assembled relation, although, of course, the fasteners 301 and the other fastening devices that are utilized serve the fundamental function of securing together the cooperating elements mentioned in the car body 32.

The above-described procedure employed in the securing of the side sill 33 to the floor panel 40 and in the securing of the side panel 70 to the side sill 33, involving the cementing procedure mentioned, will best be understood by reference to FIG. 27, wherein one of the fasteners 301 of the type previously noted is illustrated. More specifically, the fastener 301 comprises an elongated threaded shank 302 terminating at the front end in a pointed star drill 303 and terminating at the rear end in an enlarged annular collar 304 that is provided with a head 305 that may have a conventional hexagonal configuration. As previously explained, the upstanding flange 133 of the side sill 33 has a series of holes 133a punched therein that receive the shanks 302 of of the respective fasteners 301; and more particularly the punching of the hole 133a in the flange 133 causes a substantially annular burr 133b to be provided upon the inner side of the flange 133 in surrounding relation with respect to the hole 133a. Also, as previously noted, the inner surface of the upstanding flange 133 of the side sill 33 is cemented to the outer surface of the outer metal weather sheet 71 of the side panel 70 by an interposed layer of cement, as indicated at 133c. In setting the fastener 301, the star drill 303 is inserted into the hole 133a that is pushed in the flange 133; whereupon the fastener 301 is pressed home and rotated so as to cause the star drill 303 to drill its own pilot hole through the outer metal weather sheet 71 of the side panel 70 and also through the adjacent outer plywood sheet 72 thereof; whereby the threaded shank 302 of the fastener 301 threads the pilot hole mentioned and draws the annular collar 304 into firm engagement with the outer surface of the flange 133. As a consequence of the drilling of the pilot hole into the metal outer weather sheet 71, the same is deformed inwardly somewhat, as indicated at 71a, into firm bearing engagement with the adjacent outer surface of the outer plywood sheet 72, and the substantially annular burr 133b provided upon the flange 133 in surrounding relation with respect to the hole 133a is pressed into firm bearing engagement with the outer surface of the outer metal weather sheet 71. Accordingly, it will be understood that when the fastener 301 occupies its set position, as illustrated in FIG. 27, it materially enhances the bearing area between the flange 133 and the side panel 70 as a consequence of the interlocking of the burr 133b carried by the flange 133 with the outer metal weather sheet 71 and the deformation 71a of the outer weather sheet 71 into the adjacent outer plywood sheet 72; and, of course, the fastener 301 provides its own strong connection between the flange 133 and the elements 71 and 72 of the side panel 70 through the threaded shank 302, with the collar 304 in firm engagement with the outer surface of the flange 133. The star drill 303 and the lead end of the threaded shank 302 penetrate to some extent in the adjacent outer portion of the foamed resin slab 73 incorporated in the side panel 70; however, without particular effect, and without substantial impairment of the heat-insulating characteristic of the slab 73.

Furthermore, it is noted that all of the fasteners 301 that are actually incorporated between the side sill 33 and the side panel 70 have not been shown in FIG. 9 in the interest of simplification of the drawings; and for this reason, the great plurality of fasteners 301 are not illustrated in FIGS. 1, etc. of the drawings.

Considering now the actual construction arrangement of one of the end panels 60, and referring to FIGS. 28 to 32, inclusive, it will be observed that the outer metal weather sheet 61 comprises complementary upper and lower sections 61a and 61b that are seamed together, as indicated at 61x, the bottom of the upper section 61a overlying the top of the lower section 61b, and the seam 61x being secured by the utilization of a plurality of the fasteners 301, as previously described; whereby each of the sections 61a and 61b is continuous from side to side of the end panel 60. The upper liner sheet 67 comprises three complementary sections 67a, 67b and 67c, each of substantially rectangular configuration, the adjacent edges of the sections 67a, 67b and 67c being disposed in abutting relation and securely cemented together, as indicated at 67y in FIG. 30. The lower kick sheet 66 is of one-piece construction from side to side of the end panel 60, the bottom edges of the sections 67a, 67b and 67c of the upper liner sheet 67 being disposed in abutting relation with the top edge of the lower kick sheet 66 and securely cemented together, as indicated at 66x.

The inside plywood sheet 64 comprises three complementary sections 64a, 64b and 64c, each of substantially rectangular configuration, the adjacent edges of the sections 64a, 64b and 64b, 64c being disposed in abutting relation and securely cemented together, as indicated at 64y. The three sections 64a, 64b and 64c are of one-piece construction from top to bottom of the end panel 60; the two sections 64a and 64c are identical and each is of a width that is narrower than that of the central section 64b; which arrangement is utilized for the purpose of particularly locating the seams or joints 64y, as explained more fully hereinafter.

The outside plywood sheet 62 comprises three complementary sections 62a, 62b and 62c, each of substantially rectangular configuration; the adjacent edges of the sections 62a, 62b and 62b, 62c being disposed in abutting relation and securely cemented together, as indicated at 62y. The three sections 62a, 62b and 62c are of one-piece construction from top to bottom of the end panel 60; and all three of the sections 62a, 62b and 62c are identical and each is of the same width for the purpose of particularly locating the seams or joints 62y, as explained more fully hereinafter.

The slab 63 comprises ten complementary sections 63a, 63b, 63c, 63d, 63e, 63f, 63g, 63h, 63i, and 63j, each of substantially rectangular configuration. As illustrated: the section 63a is disposed above the section 63b and the abutting edges thereof are securely cemented, as indicated at 63x; the section 63c is disposed above the section 63d and the abutting edges thereof are securely cemented, as indicated at 63x; the section 63e is disposed above the section 63f and the abutting edges thereof are securely cemented, as indicated at 63x; the section 63g is disposed above the section 63h and the abutting edges thereof are securely cemented, as indicated at 63x; and the section 63i is disposed above the section 63j and the abutting edges thereof are securely cemented, as indicated at 63x. The abutting edges between the sections 63a, 63b and the sections 63c, 63d are securely cemented, as indicated at 63y; the abutting edges between the sections 63c, 63d and the sections 63e, 63f are securely cemented, as indicated at 63y; the abutting edges between the sections 63e, 63f and the sections 63g, 63h are securely cemented, as indicated at 63y; and the abutting edges between the sections 63j, 63h and the sections 63i, 63j are securely cemented, as indicated at 63y. The eight sections 63a, 63b, 63c, 63d, 63g, 63h 63i and 63j have the same width that is wider than that of the two sections 63e and 63f for the purpose of particularly locating the vertical seams or junctions 63y, as explained more fully hereinafter. The five sections 63a, 63d, 63e, 63h and 63i have substantially the same height that is greater than that of the five sections 63b, 63c, 63f, 63g and 63j for the purpose of particularly locating the horizontal seams or junctions 63x, as explained more fully hereinafter.

By virtue of the particular locations of the seams or junctions 64y between the sections 64a, 64b and 64c of the inner plywood sheet 64, and by virtue of the particular locations of the seams or junctions 62y between the sections 62a, 62b and 62c of the outer plywood sheet 62, the junctions 64y are staggered with respect to the junctions 62y through the thickness of the end panel 60, thereby to lend great strength to the composite construction thereof. Also, by virtue of the locations of the seams or junctions 63y between the various sections of the slab 63 with respect to the locations of the seams or junctions 64y and 62y, explained above, the junctions 63y are staggered with respect to both the junctions 64y and 62y through the panel 60, thereby to lend great strength in the composite construction thereof. Also, in the slab 63, two of the horizontal seams or junctions 63x are disposed adjacent to the top thereof, while three of the horizontal seams or junctions 63x are disposed adjacent to the bottom thereof, so as to obtain the desired staggering of each adjacent pair of the horizontal seams or junctions 63x, thereby to lend great strength in the composite construction of the panel 60.

As previously explained, the bulkhead 65 that is incorporated in the end panel 60 is of fabricated construction formed of "Hamerloc" so that the various horizontal and vertical seams between the great multiplicity of sections thereof are generally disposed in non-overlapping relation with respect to the various seams in the elements 62, 63 and 64, as described above.

In view of the foregoing, it will be appreciated that the end panel 60 is so constructed and arranged that there is no substantial overlapping of the horizontal or vertical seams in the component elements 61, 62, 63, 64, 65, 66 and 67 thereof through the thickness of the end panel 60, thereby to lend great strength and rigidity to the composite construction of the unitary end panel 60.

In view of the foregoing description of the construction and arrangement of the end panel 60, it will be understood that the floor panel 40, the ceiling panel 50 and each of the side panels 70 are constructed and arranged in a substantially identical manner; which detailed description is omitted in the interest of brevity.

In the foregoing specification and in the appended claims, the expressions "box car" and "heat-insulated box car" are employed in the general descriptive sense, as contrasted with the classification of railway cars with respect to the applicable tariff rates. In other words, since the body 32 of the railway car 30 has a substantially "box-shape," the railway car 30 is simply referred to as a "box car," and since each of the panels 40, 50, etc., is constructed of materials possessing substantial heat-insulating properties, the railway car 30 is simply referred to as a "heat-insulated box car". Moreover, it is noted that while no cooling or refrigerating facility for the railway car 30 has been disclosed, it will be appreciated that such conventional facility may be readily incorporated therein, insofar as such incorporation is compatible with the construction and arrangement of the car body 32.

In view of the foregoing, it is apparent that there has been provided a heat-insulated railway box car of improved and simplified construction and arrangement that is exceedingly strong, that is of lightweight construction, and that is simple and economical to manufacture. Also, there has been provided in a body for a railway car, or the like, prefabricated panels of improved and simplified construction and arrangement. Furthermore, in the railway car, an underframe has been provided that involves a plurality of cross bearers of improved and economical construction and arrangement. Further, in the railway car, there has been provided an improved arrangement of the underframe and an associated floating center sill, together with cooperating cushioning mechanism, so as to prevent the transmisison of sudden and severe longitudinal shocks between the center sill and the underframe, and consequently the car body that is formed as a unit with the underframe.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A railway car construction comprising a pair of longitudinally extending and laterally spaced-apart side sills, a pair of laterally extending and longitudinally spaced-apart end sills, the adjacent ends of said side sills and said ends being rigidly secured together to form an elongated substantially rectangular frame having a substantially horizontal top, a pair of laterally extending and longitudinally spaced-apart body bolsters arranged in said frame adjacent to the opposite ends thereof and disposed in supporting relation therewith, the outer ends of said body bolsters being respectively rigidly secured to the adjacent ones of said side sills, an elongated longitudinally extending center sill disposed below the longitudinal central portion of said frame, means for mounting said center sill upon said body bolsters for longitudinal sliding movements with respect thereto, the opposite ends of said center sill respectively projecting longitudinally outwardly from the adjacent ones of said end sills and the extreme outer ends of said center sill being hollow and adapted respectively to receive a pair of draft gears, mechanism interconnecting said body bolsters and said center sill for cushioning and for snubbing longitudinal sliding movements of said center sill relative to said body bolsters, an elongated substantially rectangular rigid floor panel arranged on top of said frame, means for securely fastening said floor panel in place on top of said frame, a row of laterally extending and longitudinally spaced-apart cross bearers arranged between said body bolsters and disposed below the bottom of said floor panel, and means for securely fastening said cross bearers to the bottom of said floor panel, the outer ends of said cross bearers being respectively rigidly secured to the adjacent ones of said side sills and the central portions of said cross bearers having longitudinally aligned openings therein through which said center sill extends, whereby said frame and said body bolsters and said floor panel and said cross bearers constitute a rigid structure independent of said center sill.

2. The railway car construction set forth in claim 1, wherein said floor panel is of composite sandwich construction including an upper layer of hardwood flooring, a first sheet of plywood intimately adhered to the lower surface of said upper layer, a slab of synthetic organic resin of cellular structure intimately adhered to the lower surface of said first sheet, a second sheet of plywood intimately adhered to the lower surface of said slab, and a lower metal weather sheet intimately adhered to the lower surface of said second sheet.

3. The railway car construction set forth in claim 1, wherein each of said cross bearers essentially comprises a pair of upstanding plates respectively disposed on opposite sides of said center sill, the outer ends of said plates being respectively rigidly secured to the adjacent ones of said side sills and the inner ends of said plates being respectively spaced laterally outwardly from the adjacent opposite sides of said center sill, a pair of flanges respectively rigidly carried by the tops of said plates and respectively securely fastened to the adjacent portions of the bottom of said floor panel, and a laterally extending tie band, the central portion of said tie band being spaced below said center sill and the opposite end portions of said tie band being respectively securely fastened to the bottoms of said plates and the extreme outer ends of said tie band being respectively rigidly secured to said side sills.

4. A railway car construction comprising a pair of longitudinally extending and laterally spaced-apart side sills, a pair of laterally extending and longitudinally spaced-apart end sills, the adjacent ends of said side sills and said end sills being rigidly secured together to form an elongated substantially rectangular frame having a substantially horizontal top, said side sills respectively carrying adjacent to the outer edges thereof a pair of upstanding longitudinally extending side flanges, said end sills respectively carrying adjacent to the outer edges thereof a pair of upstanding laterally extending end flanges, the adjacent ends of said side flanges and said end flanges being rigidly secured together to form an elongated substantially rectangular rim surrounding said frame and projecting above the top thereof, a pair of laterally extending and longitudinally spaced-apart body bolsters arranged in said frame adjacent to the opposite ends thereof and disposed in supporting relation therewith, the outer ends of said body bolsters being respectively rigidly secured to the adjacent ones of said side sills, an elongated longitudinally extending center sill disposed below the longitudinal central portion of said frame, means for mounting said center sill upon said body bolsters for longitudinal sliding movements with respect thereto, the opposite ends of said center sill respectively projecting longitudinally outwardly from the adjacent ones of said end sills and the extreme outer ends of said center sill being hollow and adapted respectively to receive a pair of draft gears, mechanism interconnecting said body bolsters and said center sill for cushioning and for snubbing longitudinal sliding movements of said center sill relative to said body bolsters, an elongated substantially rectangular rigid floor panel arranged within said rim and on top of said frame, means for securely fastening said floor panel in place upon the top of said frame, means for rigidly securing the four marginal edges of said floor panel to the respectively adjacent four upstanding flanges of said rim disposed in surrounding relation therewith, a row of laterally extending and longitudinally spaced-apart cross bearers arranged between said body bolsters, and means for securely fastening said cross bearers to the bottom of said floor panel disposed below the bottom of said floor panel and, the outer ends of said cross bearers being respectively rigidly secured to the adjacent ones of said side sills and the central portions of said cross bearers having longitudinally aligned openings therein through which said center sill extends, whereby said frame and said rim and said body bolsters and said floor panel and said cross bearers constitute a rigid structure independent of said center sill.

5. A railway car construction comprising a pair of longitudinally extending and laterally spaced-apart side sills, a pair of laterally extending and longitudinally spaced-apart end sills, the adjacent ends of said side sills and said end sills being rigidly secured together to form an elongated substantially rectangular frame having a substantially horizontal top, a pair of laterally extending and longitudinally spaced-apart body bolsters arranged in said frame adjacent to the opposite ends thereof and disposed in supporting relation therewith, two pairs of transfer plates respectively rigidly secured to the opposite outer ends of said body bolsters, each pair of said transfer plates being respectively arranged adjacent to the outer sides of said side sills and rigidly secured thereto, an elongated longitudinally extending center sill disposed below the longitudinal central portion of said frame, means for mounting said center sill upon said body bolsters for lonigtudinal sliding movements with respect thereto, the opposite ends of said center sill respectively projecting longitudinally outwardly from the adjacent ones of said end sills and the extreme outer ends of said center sill being hollow and adapted respectively to receive a pair of draft gears, mechanism interconnecting said body bolsters and said center sill for cushioning and for snubbing longitudinal sliding movements of said center sill relative to said body bolsters, an elongated substantially rectangular rigid floor panel arranged on top of said frame, means for securely fastening said floor panel in place upon the top of said frame, a row of laterally extending and longitudinally spaced-apart cross bearers arranged between said body bolsters and disposed below the bottom of said floor panel, and means for securely fastening said cross bearers to the bottom of said floor panel, the outer ends of said cross bearers being respectively rigidly secured to the adjacent ones of said side sills and the central portions of said cross bearers having longitudinally aligned openings therein through which said center sill extends, whereby said frame and said body bolsters and said floor panel and said cross bearers constitute a rigid structure independent of said center sill.

6. A railway car construction comprising a pair of longitudinally extending and laterally spaced-apart side sills, a pair of laterally extending and longitudinally spaced-apart end sills, the adjacent ends of said side sills and said end sills being rigidly secured together to form an elongated substantially rectangular frame having a substantially horizontal top, a pair of laterally extending and longitudinally spaced-apart body bolsters arranged in said frame adjacent to the opposite ends thereof and disposed in supporting relation therewith, the outer ends of said body bolsters being respectively rigidly secured to the adjacent ones of said side sills, a row of laterally extending and longitudinally spaced-apart cross bearers arranged between said body bolsters, the outer ends of said cross bearers being respectively rigidly secured to the adjacent ones of said side sills, the central portions of said body bolsters and the central portions of said cross bearers having longitudinally aligned openings therethrough that are adapted to receive an elongated longitudinally extending floating center sill, the tops of said cross bearers being arranged substantially in the plane of the top of said frame, an elongated substantially rectangular rigid floor panel arranged mutually upon the top of said frame and the tops of said cross bearers, and means for securely fastening said floor panel in place upon the top of said frame and upon the tops of said cross bearers, whereby said frame and said body bolsters and said cross bearers and said floor panel constitute a unitary rigid structure.

7. A railway car construction comprising a pair of longitudinally extending and laterally spaced-apart side sills, a pair of laterally extending and longitudinally spaced-apart end sills, the adjacent ends of said side sills and said end sills being rigidly secured together to form an elongated substantially rectangular frame having a substantially horizontal top, a row of laterally extending and longitudinally spaced-apart cross bearers arranged between said body bolsters, each of said cross bearers including a pair of laterally extending upstanding rigid plates arranged in laterally spaced-apart relation and alignment with each other, each of said cross bearers also including a pair of flanges respectively rigidly carried by the tops of said plates, the tops of said flanges being arranged substantially in the plane of the top of said frame, each of said cross bearers further including a laterally extending tie band, the central portion of each of said tie bands spanning the lateral gap between the inner ends of the adjacent pair of said plates and the opposite end portions of each of said tie bands being respectively securely fastened to the bottoms of the adjacent pair of said plates and the extreme outer ends of each of said tie bands being respectively rigidly secured to the adjacent ones of said side sills, an elongated substantially rectangular rigid floor panel arranged mutually upon the top of said frame and the tops of said flanges, and means for securely fastening said floor panel in place upon the top of said frame and upon the tops of said flanges, whereby said frame and said cross bearers and said floor panel constitute a unitary rigid structure.

8. A railway car construction comprising a pair of longitudinally extending and laterally spaced-apart side sills, a pair of laterally extending and longitudinally spaced-apart end sills, the adjacent ends of said side sills and said end sills being rigidly secured together to form an elongated substantially rectangular frame having a substantially horizontal top, an elongated substantially rectangular rigid floor panel arranged on top of said frame, means for securely fastening said floor panel in place upon the top of said frame, and a laterally extending cross bearer arranged in said frame between said end sills; said cross bearer comprising a pair of upstanding rigid plates arranged in laterally spaced-apart relation and alignment with each other, a pair of flanges respectively rigidly carried by the tops of said plates and disposed in supporting relation with respect to the bottom surface of said floor panel, means for securely fastening said floor panel to the tops of said flanges, and a laterally extending tie band, the central portion of said tie band spanning the lateral gap between the bottom inner ends of said plates and the opposite end portions of said tie band being respectively securely fastened to the bottoms of the adjacent ones of said plates and the extreme outer ends of said tie band being respectively rigidly secured to the adjacent ones of said side sills, whereby said tie band is in tension between said side sills and supports through said plates the section of said floor panel disposed above said cross bearer; whereby said frame and said floor panel and said cross bearer constitute a unitary rigid structure.

9. The railway car construction set forth in claim 8, wherein a plurality of laterally spaced-apart upstanding corrugations are provided in each of said upstanding plates to increase the rigidity thereof.

10. The railway car construction set forth in claim 8, wherein said laterally extending tie band has the general lateral configuration of a catenary between the extreme outer ends thereof, and the bottoms of said plates engaging said tie band have complementary configurations approximating corresponding sections of said catenary configuration, whereby said tie band is substantially uniformly loaded laterally by said plates disposed thereabove.

11. A heat-insulated railway box car comprising a pair of longitudinally extending and laterally spaced-apart side sills, a pair of laterally extending and longitudinally spaced-apart end sills, the adjacent ends of said side sills and said end sills being rigidly secured together to form an elongated substantially rectangular frame having a substantially horizontal top, a pair of laterally extending and longitudinally spaced-apart body bolsters arranged in said frame adjacent to the opposite ends thereof and disposed in supporting relation therewith, the outer ends of said body bolsters being respectively rigidly secured to the adjacent ones of said side sills, an elongated longitudinal extending center sill disposed below the longitudinal central portion of said frame, means for mounting said center sill upon said body bolsters for longitudinal sliding movements with respect thereto, the opposite ends of said center sill respectively projecting longitudinally outwardly from the adjacent ones of said end sills and the extreme outer ends of said center sill being hollow and adapted respectively to receive a pair of draft gears, mechanism interconnecting said body bottom bolsters and said center sill for cushioning and for snubbing longitudinal sliding movements of said center sill relative to said body bolsters, an elongated substantially rectangular rigid floor panel arranged on top of said frame, means for securely fastening said floor panel in place upon the top of said frame, a pair of upstanding longitudinally extending and laterally spaced-apart substantially rectangular rigid side wall panels respectively arranged upon said side sills, means for rigidly securing said side wall panels adjacent to the bottoms thereof both to said side sills and to the sides of said floor panel, a pair of upstanding laterally extending and longitudinally spaced-apart substantially rectangular rigid end wall panels respectively arranged upon said end sills, means for rigidly securing said end wall panels adjacent to the bottoms thereof both to said end sills and to the ends of said floor panel, means for rigidly securing to each other the adjacent ends of said side wall panels and said end wall panels, an elongated substantially rectangular rigid roof panel arranged on the tops of said side wall panels and said end wall panels, means for rigidly securing the sides of said roof panel to the tops of said side wall panels, and means for rigidly securing the ends of said roof panel to the tops of said end wall panels; each of said six panels named being of composite sandwich construction including an inner plywood sheet, a layer of synthetic organic resin of cellular structure intimately adhered to the outer surface of said inner plywood sheet, an outer plywood sheet intimately adhered to the outer surface of said resin layer, and an outer metal weather sheet intimately adhered to the outer surface of said outer plywood sheet; whereby said six panels named lend great rigidity to said frame independent of said center sill.

12. A railway car construction comprising a pair of longitudinally extending and laterally spaced-apart side sills, a pair of laterally extending and longitudinally spaced-apart end sills, the adjacent ends of said side sills and said end sills being rigidly secured together to form an elongated substantially rectangular frame having a substantially horizontal top, said side sills respectively carrying adjacent to the outer edges thereof a pair of upstanding longitudinally extending side flanges, a pair of laterally extending and longitudinally spaced-apart body bolsters arranged in said frame adjacent to the opposite ends thereof and disposed in supporting relation therewith, the outer ends of said body bolsters being respectively rigidly secured to the adjacent ones of said side sills, an elongated substantially rectangular rigid floor panel arranged on top of said frame, means for securely fastening said floor panel in place upon the top of said frame, the side edges of said floor panel being spaced laterally inwardly with respect to said side flanges, a pair of upstanding longitudinally extending and laterally spaced-apart substantially rectangular rigid side wall panels respectively carried by said side sills, the lower end of each of said side wall panels being supported upon the adjacent one of said side sills in engagement with the adjacent one of said side flanges and spaced laterally outwardly from the adjacent side edge of said floor panel, two elongated masses of synthetic organic resin respectively arranged in the two longitudinally extending spaces respectively disposed between the opposite side edges of said floor panel and the adjacent lower ends of said side wall panels and bonding together the side edges of said floor panel and the lower ends of said side panels, two longitudinally extending series of fasteners respectively carried by said side flanges and respectively engaging the lower ends of said side wall panels to produce a unitary structure of said frame and said floor panel and said side wall panels, a row of laterally extending and longitudinally spaced-apart cross bearers arranged between said body bolsters and disposed below the bottom of said floor panel, and means for securely fastening said cross bearers to the bottom of said floor panel, the outer ends of said cross bearers being respectively rigidly secured to the adjacent ones of said side sills, whereby said frame and side side flanges and said floor panel and said side wall panels and said body bolsters and said cross bearers constitute a rigid structure.

13. The railway car construction set forth in claim 12, wherein each of said side wall panels is of composite sandwich construction including a first plywood sheet, a layer of synthetic organic resin of cellular structure intimately adhered to the outer surface of said first sheet, a second plywood sheet intimately adhered to the outer surface of said layer, and a metal weather sheet intimately adhered to the outer surface of said second sheet.

14. A railway car construction comprising a pair of longitudinally extending and laterally spaced-apart side sills, a pair of laterally extending and longitudinally spaced-apart end sills, the adjacent ends of said side sills and said end sills being rigidly secured together to form an elongated substantially rectangular frame having a substantially horizontal top, said end sills respectively carrying adjacent to the outer edges thereof a pair of upstanding laterally extending end flanges, a pair of laterally extending and longitudinally spaced-apart body bolsters arranged in said frame adjacent to the opposite ends thereof and disposed in supporting relation therewith, the outer ends of said body bolsters being respectively rigidly secured to the adjacent ones of said side sills, an elongated substantially rectangular rigid floor panel arranged on top of said frame, means for securely fastening said floor panel in place upon the top of said frame, the end edges of said floor panel being spaced longitudinally inwardly with respect to said end flanges, a pair of upstanding laterally extending and longitudinally spaced-apart substantially rectangular rigid end wall panels respectively carried by said end sills, the lower end of each of said end wall panels being supported upon the adjacent one of said end sills in engagement with the adjacent one of said end flanges and spaced longitudinally outwardly from the adjacent end edge of said floor panel, two elongated masses of synthetic organic resin respectively arranged in the two laterally extending spaces respectively disposed between the opposite end edges of said floor panel and the adjacent lower ends of said end wall panels and bonding together the end edges of said floor panel and the lower ends of said end wall panels, two laterally extending series of fasteners respectively carried by said end flanges and respectively engaging the lower ends of said end wall panels to produce a unitary structure of said frame and said floor panel and said end wall panels, a row of laterally extending and longitudinally spaced-apart cross bearers arranged between said body bolsters and disposed below the bottom of said floor panel, and means for securely fastening said cross bearers to the bottom of said floor panel, the outer ends of said cross bearers being respectively rigidly secured to the adjacent ones of said side sills, whereby said frame and said end flanges and said floor panel and said end wall panels and said body bolsters and said cross bearers constitute a rigid structure.

15. The railway car construction set forth in claim 14, wherein each of said end wall panels is of composite sandwich construction including a first plywood sheet, a layer of synthetic organic resin of cellular structure intimately adhered to the outer surface of said first sheet, a second plywood sheet intimately adhered to the outer surface of said layer, and a metal weather sheet intimately adhered to the outer surface of said second sheet.

16. A railway car construction comprising a pair of longitudinally extending and laterally spaced-apart side sills, a pair of laterally extending and longitudinally spaced-apart end sills, the adjacent ends of said side sills and said end sills being rigidly secured together to form an elongated substantially rectangular frame having a substantially horizontal top, said side sills respectively carrying adjacent to the outer edges thereof a pair of upstanding longitudinally extending side flanges, said end sills respectively carrying adjacent to the outer edges thereof a pair of upstanding laterally extending end flanges, an elongated substantially rectangular rigid floor panel arranged on top of said frame, means for securely fastening said floor panel in place upon the top of said frame, the side edges of said floor panel being spaced laterally inwardly with respect to said side flanges, the end edges of said floor panel being spaced longitudinally inwardly with respect to said end flanges, a pair of upstanding longitudinally extending and laterally spaced-apart substantially rectangular rigid side wall panels respectively carried by said side sills, the lower end of each of said side wall panels being supported upon the adjacent one of said side sills in engagement with the adjacent one of said side flanges and spaced laterally outwardly from the adjacent side edge of said floor panel, two elongated first masses of synthetic organic resin respectively arranged in the two longitudinally extending spaces respectively disposed between the opposite side edges of said floor panel and the adjacent lower ends of said side wall panels and bonding together the side edges of said floor panel and the lower ends of said side wall panels, a pair of upstanding laterally extending and longitudinally spaced-apart substantially rectangular rigid end wall panels respectively carried by said end sills, the lower end of each of said end wall panels being supported upon the adjacent one of said end sills in engagement with the adjacent one of said end flanges and spaced longitudinally outwardly from the adjacent end edge of said floor panel, two elongated second masses of synthetic organic resin respectively arranged in the two laterally extending spaces respectively disposed between the opposite end edges of said floor panel and the adjacent lower ends of said end wall panels and bonding together the end edges of said floor panel and the lower ends of said end panels, two longitudinally extending series of fasteners respectively carried by said side flanges and respectively engaging the lower ends of said side wall panels, two laterally extending series of fasteners respectively carried by said end flanges and respectively engaging the lower ends of said end wall panels, four upstanding corner posts respectively carried by the four corners of said frame, the lower end of each of said corner posts being rigidly secured to the adjacent meeting ends of one of said side sills and one of said end sills, each of said corner posts being spaced longitudinally outwardly with respect to the adjacent end edge of one of said side wall panels and spaced laterally outwardly with respect to the adjacent end edge of one of said end wall panels, and four upstanding third masses of synthetic organic resin respectively arranged adjacent to said corner posts and the end edges of said side wall panels and the end edges of said end wall panels, each of said upstanding third masses mutually bonding together one of said corner posts and the adjacent end edge of one of said side wall panels and the adjacent end edge of one of said end wall panels.

17. The railway car construction set forth in claim 16, wherein each of said side wall panels includes an outer metal weather sheet, and each of said end wall panels includes an outer metal weather sheet, and further comprising four upstanding metal outer side-end corner plates respectively disposed adjacent to said four corner posts and respectively enclosing the same, each of said side-end corner plates including a first flange overlapping both the adjacent end of one of said side flanges and the adjacent end of the outer weather sheet of one of said side wall panels and a second flange overlapping both the adjacent end of one of said end flanges and the adjacent end of the outer weather sheet of one of said end wall panels, and eight series of fasteners respectively carried by said eight flanges of said four corner plates and respectively engaging the ones of said parts underlying the same.

18. A railway car construction comprising a pair of longitudinally extending and laterally spaced-apart side sills, a pair of laterally extending and longitudinally spaced-apart end sills, the adjacent ends of said side sills and said end sills being rigidly secured together to form an elongated substantially rectangular floor frame having a substantially horizontal top, said side sills respectively carrying adjacent to the outer edges thereof a pair of upstanding longitudinally extending side flanges, an elongated substantially rectangular rigid floor panel arranged on top of said floor frame, means for securely fastening said floor panel in place upon the top of said frame, the side edges of said floor panel being spaced laterally inwardly with respect to the adjacent ones of said side flanges, four upstanding corner posts respectively carried by the four corners of said floor frame, means for rigidly securing the lower ends of said four corner posts to the four corners of said floor frame, a pair of rigid door frames respectively carried by the central portions of said side flanges, each of said door frames being substantially rectangular and including top and bottom members and a pair of side members, means for rigidly securing the bottom member of each of said door frames to the adjacent one of said side flanges, four upstanding substantially rectangular rigid side wall panels arranged in two laterally spaced-apart pairs respectively carried by said side sills, the two side wall panels of each of said pairs being longitudinally aligned and respectively disposed on opposite sides of the adjacent one of said door frames, one end edges of each of said side wall panels being spaced longitudinally inwardly with respect to the adjacent side member of one of said door frames and the other end edge of each of said side wall panels being spaced longitudinally inwardly with respect to the adjacent one of said corner posts, the bottom edge of each of said side wall panels being supported by the adjacent one of said side sills in engagement with the adjacent one of said side flanges and spaced laterally outwardly with respect to the adjacent side edge of said floor panel, means for rigidly securing each of said side wall panels to the adjacent one of said side sills, an elongated substantially rectangular rigid roof panel supported adjacent to the side edges thereof upon the top edges of said side wall panels, means for rigidly securing said roof panel to said side panels, and two substantially rectangular masses of synthetic organic resin respectively surrounding said door frames; each of said masses including a top section bonded both to the top member of the adjacent one of said door frames and to the adjacent side edge of said roof panel, a bottom section bonded both to the bottom member of the adjacent one of said door frames and to the adjacent side edge of said floor panel, and two side sections respectively bonded both to the side members of the adjacent one of said door frame and to the end edges of the adjacent ones of said side wall panels.

19. The railway car construction set forth in claim 18, wherein the bottom member of each of said door frames further comprises an inwardly directed threshold plate carried by the top thereof and projecting laterally inwardly in covering relation with the adjacent side portion of said floor panel.

20. A railway car body comprising an elongated substantially rectangular rigid floor panel, an elongated substantially rectangular rigid roof panel, two laterally extending and longitudinally spaced-apart upstanding substantially rectangular rigid end wall panels, means for rigidly securing the lower end of each of said end wall panels to the adjacent end of said floor panel, means for rigidly securing the upper end of each of said end panels to the adjacent end of said roof panel, a pair of rigid door frames, each of said door frames being substantially rectangular and including top and bottom members and a pair of side members, means for rigidly securing the bottom members of said door frames respectively to the central portions of the opposite sides of said floor panel, means for rigidly securing the top members of said door frames respectively to the central portions of the opposite sides of said roof panel, four upstanding substantially rectangular rigid side wall panels arranged in two laterally spaced-apart pairs, the two side wall panels of each of said pairs being longitudinally aligned and respectively disposed on opposite sides of the adjacent one of said door frames, means for rigidly securing the bottom of each of said wall panels to the adjacent portion of the side of said floor panel, means for rigidly securing the top of each of said side wall panels to the adjacent portion of the side of said roof panel, means for rigidly securing one end of each of said side wall panels to the adjacent end of one of said end wall panels, means for rigidly securing the other end of each of said side wall panels to one of the side members of the adjacent one of said door frames; wherein each of said floor panel and said roof panel and said two end wall panels and said four side wall panels is of composite sandwich construction; and wherein each of said sandwich constructions includes a first plywood sheet, a layer of synthetic organic resin of cellular structure intimately adhered to the outer surface of said first sheet, a second plywood sheet intimately adhered to the outer surface of said layer, and an outer metal weather sheet intimately adhered to the outer surface of said second sheet.

21. The railway car body set forth in claim 20, and further comprising a plurality of laterally extending and longitudinally spaced-apart rigid carlines arranged upon the top of said roof panel adjacent to the central portion thereof, and means for rigidly fastening said car lines upon the top of said roof panel, thereby to reinforce the central portion of said body adjacent to said door frame.

22. A railway car body comprising an elongated substantially rectangular rigid floor panel, an elongated substantially rectangular rigid roof panel, two laterally extending and longitudinally spaced-apart upstanding substantially rectangular rigid end wall panels, means for rigidly securing the bottom of each of said end wall panels to the adjacent end of said floor panel, means for rigidly securing the top of each of said end wall panels to the adjacent end of said roof panel, two longitudinally extending and laterally spaced-apart upstanding substantially rectangular rigid side wall panels, means for rigidly securing the bottom of each of said side wall panels to the adjacent side of said floor panel, means for rigidly securing the top of each of said side wall panels to the adjacent side of said roof panel, and means for rigidly securing the opposite ends of each of said end wall panels respectively to the adjacent ends of said side wall panels; wherein each of said floor panel and said roof panel and said two end wall panels and said two side wall panels is of composite sandwich construction; and wherein each of said sandwich constructions includes a first plywood sheet, a slab of synthetic organic resin of cellular structure intimately adhered to the outer surface of said first sheet, a second plywood sheet intimately adhered to the outer surface of said slab, and an outer metal weather sheet intimately adhered to the outer surface of said second sheet.

23. The railway car body set forth in claim 22, wherein the lower portion of each of said end wall panels comprises an inner metal kick sheet intimately adhered to the lower inner surface of the adjacent first sheet, and the upper portion of each of said end wall panels and each of said side wall panels comprises an inner hardwood sheet intimately adhered to the upper inner surface of the adjacent first sheet.

24. The railway car body set forth in claim 22, and further comprising a pair of inner end-roof corner plates respectively arranged in the upper inner corners of said body at the respective junctions between the opposite ends of said roof panel and the tops of said end wall panels, means for rigidly securing said inner end-roof corner plates to the parts covered thereby, a pair of inner side-roof corner plates respectively arranged in the upper inner corners of said body at the respective junctions between the opposite sides of said roof panel and the tops of said side wall panels, means for rigidly securing said inner side-roof corner plates to the parts covered thereby, a pair of outer end-roof corner plates respectively arranged in covering relation with the upper outer corners of said body at the junctions between the opposite ends of said roof panel and the tops of said end wall panels, means for rigidly securing said outer end-roof corner plates to the parts covered thereby, a pair of outer side-roof corner plates respectively arranged in covering relation with the upper outer corners of said body at the junctions between the opposite sides of said roof panel and the tops of said side wall panels and means for rigidly securing said outer side-roof corner plates to the parts covered thereby.

25. The railway car body set forth in claim 24, and further comprising four upstanding outer end-side corner plates respectively arranged in covering relation with the four outer corners of said body at the junctions between the opposite ends of said end wall panels and the opposite ends of said side wall panels, and means for rigidly securing said outer end-side corner plates to the parts covered thereby.

26. A railway box car body comprising an elongated substantially rectangular rigid floor structure, an elongated substantially rectangular rigid roof structure, two upstanding laterally extending and longitudinally spaced-apart substantially rectangular rigid end wall structures, means for rigidly securing the bottom of each of said end wall structures to the adjacent end of said floor structure, means for rigidly securing the top of each of said end wall structures to the adjacent end of said roof structure, a first pair of longitudinally extending substantially rectangular rigid side wall panels arranged on one side of said body in longitudinally spaced-apart relation and alignment with each other to define one upstanding substantially centrally disposed side doorway into said one side of said body, a second pair of longitudinally extending substantially rectangular rigid side wall panels arranged on the other side of said body in longitudinally spaced-apart relation and alignment with each other to define another upstanding substantially centrally disposed side doorway into said other side of said body, means for rigidly securing the bottom of each of said side wall panels to the adjacent portion of the side of said floor structure, means for rigidly securing the top of each of said side wall panels to the adjacent portion of the side of said roof structure, and means for rigidly securing one end of each of said side wall panels to the end of the adjacent one of said end wall structures; wherein each of said side wall panels is of composite sandwich construction including a first sheet of plywood, a layer of synthetic organic resin of rigid cellular structure intimately adhered to the outer surface of said first sheet, a second sheet of plywood intimately adhered to the outer surface of said layer, and an outer weather sheet of metal intimately adhered to the outer surface of said second sheet, said weather sheet being substantially uniformly restrained by said adjacent second sheet through substantially the entire area of said weather sheet in order to accommodate deflection of said weather sheet within its elastic limit without crushing or buckling of localized areas thereof; each of said side wall panels being characterized by the total absence of incorporated internal and external and intermediate posts or other structural members.

27. A railway box car body comprising an elongated substantially rectangular rigid floor structure, an elongated substantially rectangular rigid roof structure, two longitudinally extending and laterally spaced-apart substantially rectangular side wall structures, means for rigidly securing the bottom of each of said side wall structures to the adjacent side of said floor structure, means for rigidly securing the top of each of said side wall structures to the adjacent side of said roof structure, two upstanding laterally extending and longitudinally spaced-apart substantially rectangular rigid end wall panels, means for rigidly securing the bottom of each of said end wall panels to the adjacent end of said floor structure, means for rigidly securing the top of each of said end wall panel to the adjacent end of said roof structure, and means for rigidly securing the opposite ends of each of said end wall panels to the adjacent ends of said side wall structures; wherein each of said end wall panels is of composite sandwich construction including a first sheet of plywood, a layer of synthetic organic resin of rigid cellular structure intimately adhered to the outer surface of said first sheet, a second sheet of plywood intimately adhered to the outer surface of said layer, and an outer weather sheet of metal intimately adhered to the outer surface of said second sheet, said weather sheet being substantially uniformly restrained by said adjacent second sheet throughout substantially the entire area of said weather sheet in order to accommodate deflection of said weather sheet within its elastic limit without crushing or buckling of localized areas thereof; each of said end wall panels being characterized by the total absence of incorporated internal and external and intermediate posts or other structural members.

References Cited by the Examiner
UNITED STATES PATENTS

| | | | |
|---|---|---|---|
| 2,047,955 | 7/36 | Fitch | 105—454 |
| 2,227,684 | 1/41 | Johnsen | 105—423 |
| 2,287,400 | 6/42 | Wells | 105—423 |
| 2,379,640 | 7/45 | Johnsen | 105—410 |
| 2,425,883 | 8/47 | Jackson | 50—268 |
| 2,642,817 | 6/53 | Goldberg | 105—404 |
| 2,642,818 | 6/53 | Talmey | 105—409 |
| 2,736,273 | 2/56 | Goldberg | 105—404 |
| 2,752,865 | 7/56 | Candlin | 105—414 |
| 2,818,982 | 1/58 | McCafferty et al. | 213—8 |
| 2,962,323 | 11/60 | McBride | 105—423 |
| 3,000,144 | 9/61 | Kitson | 50—268 |
| 3,003,810 | 10/61 | Kloote et al. | 296—28.2 |

LEO QUACKENBUSH, *Primary Examiner.*

NELSON M. ELLISON, *Examiner.*

UNITED STATES PATENT OFFICE
CERTIFICATE OF CORRECTION

Patent No. 3,175,520                              March 30, 1965

Paul Talmey

It is hereby certified that error appears in the above numbered patent requiring correction and that the said Letters Patent should read as corrected below.

Column 30, lines 7 and 8, for "longitudinal" read -- longitudinally --; column 31, line 18, for "side", first occurrence, read -- said --; column 35, line 2, after "panels" insert -- and each of said side wall panels --.

Signed and sealed this 24th day of August 1965.

(SEAL)
Attest:

ERNEST W. SWIDER                              EDWARD J. BRENNER
Attesting Officer                               Commissioner of Patents